US012601986B2

(12) United States Patent
Harashima et al.

(10) Patent No.: US 12,601,986 B2
(45) Date of Patent: Apr. 14, 2026

(54) TONER, RESIN PARTICLES, DEVELOPER, TONER STORAGE UNIT, IMAGE FORMING APPARATUS, METHOD FOR PRODUCING TONER, AND IMAGE FORMING METHOD

(71) Applicants: Tomomi Harashima, Shizuoka (JP); Junichi Watanabe, Shizuoka (JP); Hiroshi Yamashita, Shizuoka (JP); Shinya Nakayama, Shizuoka (JP)

(72) Inventors: Tomomi Harashima, Shizuoka (JP); Junichi Watanabe, Shizuoka (JP); Hiroshi Yamashita, Shizuoka (JP); Shinya Nakayama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1019 days.

(21) Appl. No.: 17/557,284

(22) Filed: Dec. 21, 2021

(65) Prior Publication Data

US 2022/0197165 A1 Jun. 23, 2022

(30) Foreign Application Priority Data

Dec. 23, 2020 (JP) ................................ 2020-213528
Oct. 26, 2021 (JP) ................................ 2021-174760
Dec. 13, 2021 (JP) ................................ 2021-201637

(51) Int. Cl.
*G03G 9/087* (2006.01)
*G03G 13/01* (2006.01)

(52) U.S. Cl.
CPC ..... *G03G 9/08755* (2013.01); *G03G 9/08795* (2013.01); *G03G 13/0133* (2021.01)

(58) Field of Classification Search
CPC ......................... G03G 9/08755; G03G 9/0821
See application file for complete search history.

(56) References Cited

U.S. PATENT DOCUMENTS 4,620,987 A 11/1986 Yamashita et al.
4,885,350 A 12/1989 Yamashita et al.
5,368,972 A 11/1994 Yamashita et al.
(Continued)

FOREIGN PATENT DOCUMENTS

JP 2003-066646 3/2003
JP 2003-255588 9/2003
JP 2015-125413 7/2015

OTHER PUBLICATIONS

Kenneth Barbalace. Periodic Table of Elements—Sorted by Ionic Radius. EnvironmentalChemistry.com. 1995-2025. Accessed online: Mar. 5, 2025 https://EnvironmentalChemistry.com/yogi/periodic/ionicradius.html (Year: 1995).*
(Continued)

*Primary Examiner* — Mark F. Huff
*Assistant Examiner* — Boone Alexander Evans
(74) *Attorney, Agent, or Firm* — Grüneberg Global IP PLLC

(57) ABSTRACT

Provided is a toner including toner base particles. Each toner base particle includes a crosslinked component. The cross-linked component includes a nonlinear polymer having 3 or more branches, terminals of which are metal ion crosslinked, and a glass transition temperature Tg of the nonlinear polymer as measured by differential scanning calorimetry is −60° C. or higher but lower than 0° C.

14 Claims, 5 Drawing Sheets

(56) References Cited

U.S. PATENT DOCUMENTS

| | | | | |
|---|---|---|---|---|
| 5,541,031 | A | 7/1996 | Yamashita et al. | |
| 5,565,298 | A | 10/1996 | Suguro et al. | |
| 5,576,393 | A | 11/1996 | Yamashita et al. | |
| 5,648,842 | A | 7/1997 | Sekine et al. | |
| 6,125,257 | A | 9/2000 | Sekine et al. | |
| 6,140,000 | A | 10/2000 | Yamashita | |
| 6,255,028 | B1 | 7/2001 | Hasegawa et al. | |
| 6,329,115 | B1 | 12/2001 | Yamashita | |
| 6,403,275 | B1 | 6/2002 | Kuramoto et al. | |
| 6,416,914 | B1 | 7/2002 | Nakamura et al. | |
| 6,432,589 | B1 | 8/2002 | Uchinokura et al. | |
| 6,503,676 | B2 | 1/2003 | Yamashita et al. | |
| 6,855,468 | B1 | 2/2005 | Yamashita et al. | |
| 7,074,541 | B2 | 7/2006 | Yamashita et al. | |
| 7,364,828 | B2 | 4/2008 | Yamashita et al. | |
| 7,455,942 | B2 | 11/2008 | Nagatomo et al. | |
| 8,673,528 | B2 | 3/2014 | Sugimoto et al. | |
| 9,152,069 | B2 | 10/2015 | Watanabe et al. | |
| 9,557,670 | B2 | 1/2017 | Shiba et al. | |
| 9,563,141 | B2 | 2/2017 | Sugimoto et al. | |
| 9,606,464 | B2 | 3/2017 | Yamauchi et al. | |
| 9,851,649 | B2 | 12/2017 | Makabe et al. | |
| 2002/0081510 | A1 | 6/2002 | Sugiyama et al. | |
| 2003/0022084 | A1 | 1/2003 | Sugiyama et al. | |
| 2003/0027066 | A1 | 2/2003 | Yamashita et al. | |
| 2003/0027074 | A1 | 2/2003 | Emoto et al. | |
| 2003/0055159 | A1 | 3/2003 | Yamashita et al. | |
| 2003/0077536 | A1 | 4/2003 | Yamashita et al. | |
| 2003/0087169 | A1 | 5/2003 | Uchinokura et al. | |
| 2003/0096185 | A1 | 5/2003 | Yamashita et al. | |
| 2003/0113648 | A1 | 6/2003 | Tomita et al. | |
| 2003/0134220 | A1 | 7/2003 | Emoto et al. | |
| 2003/0138717 | A1 | 7/2003 | Yagi et al. | |
| 2003/0152859 | A1 | 8/2003 | Emoto et al. | |
| 2003/0219669 | A1 | 11/2003 | Yamashita et al. | |
| 2004/0076899 | A1 | 4/2004 | Sugiyama et al. | |
| 2004/0076900 | A1 | 4/2004 | Sugiyama et al. | |
| 2004/0115551 | A1 | 6/2004 | Sugiyama et al. | |
| 2004/0121256 | A1 | 6/2004 | Suzuki et al. | |
| 2004/0131961 | A1 | 7/2004 | Watanabe et al. | |
| 2004/0185365 | A1 | 9/2004 | Saito et al. | |
| 2004/0259013 | A1 | 12/2004 | Ohtani et al. | |
| 2005/0003288 | A1 | 1/2005 | Sugiyama et al. | |
| 2005/0079433 | A1 | 4/2005 | Watanabe et al. | |
| 2006/0177756 | A1 | 8/2006 | Sugimoto et al. | |
| 2006/0292482 | A1 | 12/2006 | Yamashita et al. | |
| 2007/0015077 | A1 | 1/2007 | Yamashita et al. | |
| 2007/0141500 | A1 | 6/2007 | Sugimoto et al. | |
| 2007/0184370 | A1 | 8/2007 | Yamashita et al. | |
| 2008/0032226 | A1 | 2/2008 | Sugiyama et al. | |
| 2008/0280218 | A1 | 11/2008 | Sabu et al. | |
| 2008/0280219 | A1 | 11/2008 | Nakayama et al. | |
| 2008/0318144 | A1 | 12/2008 | Watanabe et al. | |
| 2008/0318148 | A1 | 12/2008 | Sugimoto et al. | |
| 2009/0162780 | A1 | 6/2009 | Yamashita et al. | |
| 2010/0075245 | A1 | 3/2010 | Watanabe et al. | |
| 2010/0272481 | A1* | 10/2010 | Yamamoto ......... | G03G 15/2053 399/328 |
| 2011/0076610 | A1 | 3/2011 | Ogawa et al. | |
| 2011/0129773 | A1 | 6/2011 | Shu et al. | |
| 2011/0136052 | A1 | 6/2011 | Watanabe et al. | |
| 2011/0151372 | A1 | 6/2011 | Watanabe et al. | |
| 2011/0223532 | A1 | 9/2011 | Sugimoto et al. | |
| 2011/0262853 | A1 | 10/2011 | Watanabe et al. | |
| 2012/0189951 | A1 | 7/2012 | Sugimoto et al. | |
| 2012/0219896 | A1 | 8/2012 | Asahina et al. | |
| 2012/0237870 | A1 | 9/2012 | Watanabe et al. | |
| 2013/0059249 | A1 | 3/2013 | Watanabe et al. | |
| 2013/0157185 | A1 | 6/2013 | Sakashita et al. | |
| 2013/0164669 | A1 | 6/2013 | Yamashita et al. | |
| 2014/0023965 | A1 | 1/2014 | Chiba et al. | |
| 2014/0080046 | A1 | 3/2014 | Asahina et al. | |
| 2014/0272689 | A1 | 9/2014 | Yamashita et al. | |
| 2015/0268574 | A1 | 9/2015 | Miyaake et al. | |
| 2016/0011537 | A1* | 1/2016 | Higuchi ............. | G03G 15/2007 399/177 |
| 2017/0160662 | A1* | 6/2017 | Nagashima ........ | G03G 9/08782 |
| 2018/0253022 | A1* | 9/2018 | Takeda ............... | G03G 9/08797 |
| 2019/0235405 | A1 | 8/2019 | Masuda et al. | |
| 2020/0089140 | A1 | 3/2020 | Masuda et al. | |

OTHER PUBLICATIONS

U.S. Appl. No. 06/752,591, filed Jul. 8, 1985.
U.S. Appl. No. 07/362,488, filed Jun. 7, 1989.
U.S. Appl. No. 07/596,474, filed Oct. 12, 1990.
U.S. Appl. No. 07/948,453, filed Sep. 21, 1992.
U.S. Appl. No. 08/165,101, filed Dec. 10, 1993.
U.S. Appl. No. 17/407,266, filed Aug. 20, 2021.

* cited by examiner

TONER, RESIN PARTICLES, DEVELOPER, TONER STORAGE UNIT, IMAGE FORMING APPARATUS, METHOD FOR PRODUCING TONER, AND IMAGE FORMING METHOD

CROSS-REFERENCE TO RELATED APPLICATIONS

The present application claims priority under 35 U.S.C. § 119 to Japanese Patent Application No. 2020-213528 filed Dec. 23, 2020, Japanese Patent Application No. 2021-174760 filed Oct. 26, 2021, Japanese Patent Application No. 2021-201637 filed Dec. 13, 2021. The contents of which are incorporated herein by reference in their entirety.

BACKGROUND OF THE INVENTION

Field of the Invention

The present disclosure relates to a toner, resin particles, a developer, a toner storage unit, an image forming apparatus, a method for producing a toner, and an image forming method.

Description of the Related Art

An image forming apparatus using a toner, such as a multifunction peripheral (MFP) and a printer, has been widely used in various scene. In order to achieve high quality output images and energy saving through low energy consumption during fixing, a toner is desired to have hot offset resistance and low temperature fixability.

For example, proposed as a toner having improved hot offset resistance and low temperature fixability is a toner including toner particles, where the toner particles are obtained by performing a surface treatment of the toner particles with hot air, and the toner particles are obtained by mixing toner base particles each including a predetermined binder resin, wax, and a colorant, and predetermined boron nitride particles (see, for example, Japanese Unexamined Patent Application Publication No. 2015-125413).

SUMMARY OF THE INVENTION

According to one aspect of the present disclosure, a toner includes toner base particles. Each of the toner base particles includes a crosslinked component. The crosslinked component includes a nonlinear polymer having 3 or more branches, terminals of which are metal ion crosslinked. A glass transition temperature of the nonlinear polymer as measured by differential scanning calorimetry is −60° C. or higher but lower than 0° C.

DESCRIPTION OF THE EMBODIMENTS

Figure 1:
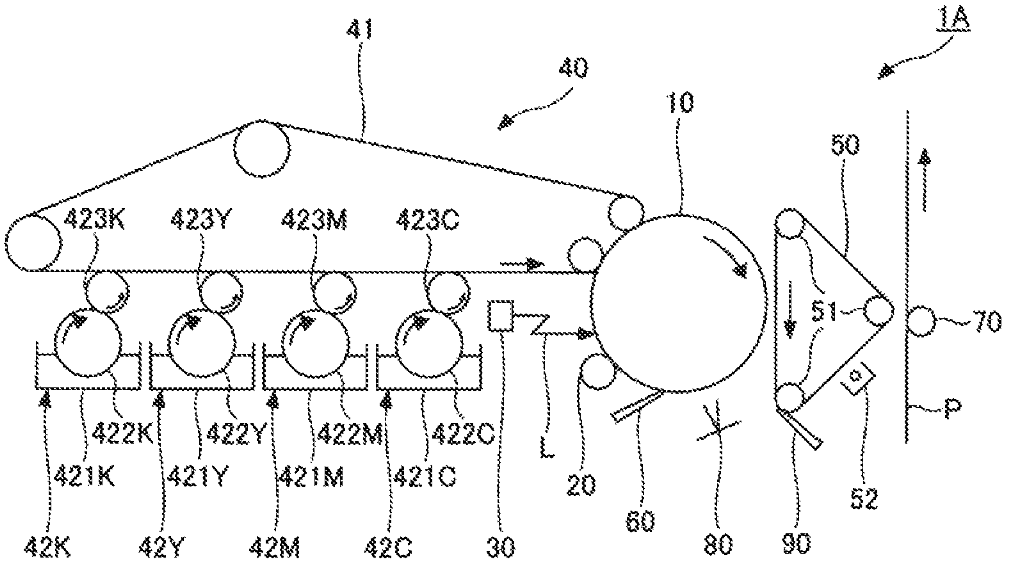
FIG. 1 is a schematic view illustrating an example of the image forming apparatus according to one aspect.

Embodiments of the present disclosure will be described in detail, hereinafter. Embodiments or aspects of the present disclosure are not limited by the following disclosure, and may be appropriately changed within the scope of the present disclosure. In the present specification, moreover, the phrase indicating the numerical range "from a through b" means that the numerical values "a" and "b" are included in the range as the lower limit and the upper limit, unless otherwise stated.

(Toner)

One aspect of the toner of the present disclosure includes toner base particles, and each toner particle includes a crosslinked component. The crosslinked component includes a nonlinear polymer having 3 or more branches, terminals of which are metal ion crosslinked. A glass transition temperature Tg of the nonlinear polymer as measured by differential scanning calorimetry is −60° C. or higher but lower than 0° C.

One aspect of the toner of the present disclosure includes toner base particles, and each toner particle includes a crosslinked component. The crosslinked component includes a binder resin, and the binder resin includes a tetrahydrofuran (THF) insoluble component. The THF insoluble component includes a nonlinear polymer having 3 or more branches, and a metal ion. A glass transition temperature Tg of the THF insoluble component as measured by differential scanning calorimetry is −60° C. or higher but lower than 0° C.

The present disclosure has an object to provide a toner and resin particles, both of which have excellent chargeability, low temperature fixability, hot offset resistance, and blocking resistance after fixing.

The present disclosure can provide a toner and resin particles, both of which have excellent chargeability, low temperature fixability, hot offset resistance, and blocking resistance after fixing.

In connection with the toner disclosed in Japanese Unexamined Patent Application Publication No. 2015-125413, which is related art, improvement in chargeability and blocking resistance has not been considered. Generally, background deposition or toner scattering may occur as chargeability of a toner reduces. In order to obtain excellent low temperature fixability, moreover, values of thermal properties of a binder resin constituting a toner are set low. Therefore, it has been known that it is difficult to achieve both low temperature fixability and blocking resistance at the same time.

The present inventors have diligently studied a toner including a binder resin or a crosslinked component. For this reason, the present inventors have studied a relationship between a branched structure, terminal structure, and glass transition temperature Tg of the crosslinked component, and properties of the crosslinked component. As a result, the present inventors have attained the following insights. The crosslinked component can exhibit rubber-like behaviors that the crosslinked component deforms but does not flow at a low temperature, when the crosslinked component includes a nonlinear polymer having 3 or more branches, terminals of which are metal ion crosslinked, and a glass transition temperature Tg of the nonlinear polymer, particularly a glass transition temperature $Tg_{2nd}$ at second heating, as measured by differential scanning calorimetry is −60° C. or higher but lower than 0° C. Since the toner of the present disclosure includes the crosslinked component having the above-described structure in addition to a binder resin, the toner has excellent chargeability, hot offset resistance, and blocking resistance after fixing as well as maintaining low temperature fixability.

<Binder Resin>

According to one aspect of the toner of the present disclosure includes toner base particles, each toner base particle including a binder resin. The binder resin includes an amorphous polyester resin, and may further include a crystalline polyester resin according to the necessity. The amorphous polyester resin is preferably a linear polymer. Moreover, the amorphous polyester resin is preferably an unmodified polyester resin.

According to one aspect of the toner of the present disclosure, the toner includes toner base particles, each toner base particles including a binder resin. The binder resin includes a tetrahydrofuran (THF) insoluble component, and may further include a crystalline resin according to the necessity.

<<Unmodified Polyester Resin>>

The unmodified polyester resin is a polyester resin obtained with polyvalent alcohol, and polyvalent carboxylic acid (e.g., polyvalent carboxylic acid, polyvalent carboxylic acid anhydride, and polyvalent carboxylic acid ester) or a derivative thereof. The unmodified polyester resin is a polyester resin that is not modified with an isocyanate compound etc.

Examples the polyvalent alcohol used in the unmodified polyester resin include diol.

Examples of diol used in the unmodified polyester resin include: (C2-C3) alkylene oxide adducts (the average number of moles added: from 1 through 10) of bisphenol A, such as polyoxypropylene(2,2)-2,2-bis(4-hydroxyphenyl)propane, and polyoxyethylene(2,2)-2,2-bis(4-hydroxyphenyl) propane; ethylene glycol, and propylene glycol; hydrogenated bisphenol A; and (C2-C3) alkylene oxide adducts (the average number of moles added: from 1 through 10) of hydrogenated bisphenol A. The above-listed examples may be used alone or in combination.

Examples of the polyvalent carboxylic acid include dicarboxylic acid.

Examples of the dicarboxylic acid include adipic acid, phthalic acid, isophthalic acid, terephthalic acid, fumaric acid, maleic acid, and succinic acid substituted with a C1-C20 alkyl group or C2-C20 alkenyl group, such as dodecenyl succinic acid, and octyl succinic acid. The above-listed examples may be used alone or in combination.

For the purpose of adjusting an acid value and hydroxyl value, the binder resin may include, at terminals of the molecular chain thereof, trivalent or higher carboxylic acid, or trivalent or higher alcohol, or both.

Examples of the trivalent or higher carboxylic acid include trimellitic acid, pyromellitic acid, and acid anhydride.

Examples of the trivalent or higher alcohol include glycerin, pentaerythritol, and trimethylolpropane.

The acid value of the binder resin is not particularly limited and may be appropriately selected depending on the intended purpose. The acid value thereof is preferably from 1 mgKOH/g through 50 mgKOH/g, and more preferably from 5 mgKOH/g through 30 mgKOH/g.

When the acid value of the binder resin is 1 mgKOH/g or greater, the toner tends to be negatively charged, and affinity between paper and the toner improves when the toner is fixed on the paper to improve low temperature fixability. Therefore, the binder resin having the above-mentioned acid value is preferable.

When the acid value of the binder resin is 50 mgKOH/g or less, reduction in charging stability, especially charging stability against the fluctuations of the environmental conditions, can be prevented. Therefore, the binder resin having the above-mentioned acid value is preferable.

The hydroxyl value of the binder resin is not particularly limited and may be appropriately selected depending on the intended purpose. The hydroxyl value thereof is preferably 5 mgKOH/g or greater.

A molecular weight of the binder resin is not particularly limited and may be appropriately selected depending on the intended purpose. When the molecular weight of the binder resin is too low, heat resistant storage stability of the toner may be insufficient, and durability of the toner against stress applied inside a developing device, such as stirring, may be insufficient. When the molecular weight of the binder resin is too high, viscoelasticity of the toner as melted becomes high, leading to insufficient low temperature fixability. Therefore, the weight average molecular weight Mw of the binder resin as measured by gel permeation chromatography (GPC) is preferably from 3,000 through 10,000, and more preferably from 4,000 through 7,000. Moreover, the number average molecular weight Mn of the binder resin is preferably from 1,000 through 4,000, and more preferably from 1,500 through 3,000.

Moreover, Mw/Mn of the binder resin is preferably from 1.0 through 4.0, and more preferably from 1.0 through 3.5.

The glass transition temperature Tg of the binder resin is preferably from 40° C. through 70° C., and more preferably from 50° C. through 60° C.

The binder resin having the glass transition temperature Tg of 40° C. or higher is preferable because heat resistant storage stability of the toner, durability of the toner against stress, such as stirring, applied inside a developing device, and anti-filming properties can be maintained.

The binder resin having the glass transition temperature Tg of 70° C. or lower is preferable because the toner is sufficiently deformed by heat and pressure applied during fixing, and sufficient low temperature fixability is achieved.

The molecular structure of the binder resin can be confirmed by solution or solid NMR spectroscopy, X-ray diffraction spectroscopy, GC/MS, LC/MS, or IR spectroscopy. Example of the simple method thereof include a method where a compound that gives an infrared absorption spectrum having absorption based on $\delta_{CH}$ (out plane bending) of olefin at 965±10 $cm^{-1}$ and 990±10 $cm^{-1}$ is detected as the binder resin.

The amount of the binder resin is not particularly limited and may be appropriately selected depending on the intended purpose. The amount thereof is preferably from 50 parts by mass through 90 parts by mass, and more preferably from 60 parts by mass through 80 parts by mass, relative to 100 parts by mass of the toner.

When the amount of the binder resin is 50 parts by mass or greater, suitable dispersibility of the pigment and release agent inside the toner base particles can be maintained, and fogging and disturbance of an image are unlikely to occur. Therefore, the above-mentioned amount of the binder resin is preferable.

When the amount of the binder resin is 90 parts by mass or less, reduction in the amount of the below-described nonlinear polymer can be suppressed, and low temperature fixability can be maintained. Therefore, the above-mentioned amount of the binder resin is preferable.

Moreover, the amount of the binder resin is within the above-mentioned more preferable range is preferable because both high image quality and low temperature fixability can be achieved.

<<Crystalline Resin>>

The crystalline resin is preferably a crystalline resin that melts at a temperature near a fixing temperature. Since such the crystalline resin is included in the toner, the crystalline resin becomes compatible with a binder resin at the fixing temperature owing to melting of the crystalline resin, to thereby improve sharp-melt properties of the toner. As a result, an excellent effect of low temperature fixability is exhibited.

The melting point of the crystalline resin is not particularly limited and may be appropriately selected depending on the intended purpose. The melting point thereof is preferably from 60° C. through 100° C.

The crystalline resin having the melting point of 60° C. or higher is preferable because the crystalline resin does not easily melted at a low temperature and therefore heat resistant storage stability of the toner can be maintained.

The crystalline resin having the melting point of 100° C. or lower is preferable because the toner can exhibit sufficient low temperature fixability.

The crystalline resin is not particularly limited, as long as the crystalline resin has crystallinity. The crystalline resin may be appropriately selected depending on the intended purpose. Examples thereof include a polyester resin, a polyurethane resin, a polyurea resin, a polyamide resin, a polyether resin, a vinyl-based resin, and a modified-crystalline resin. The above-listed examples may be used alone or in combination.

When the binder resin for use in the present disclosure includes a crystalline polyester resin as the crystalline resin, an amount of the crystalline polyester resin is not particularly limited and may be appropriately selected depending on the intended purpose. The amount thereof is preferably from 3 parts by mass through 20 parts by mass, more preferably from 5 parts by mass through 15 parts by mass, relative to 100 parts by mass of the toner.

The amount of the crystalline polyester resin being 3 parts by mass or greater is preferable because sharp melt properties owing to the crystalline polyester resin can be sufficiently obtained, and sufficient low temperature fixability can be exhibited.

The amount of the crystalline polyester resin being 20 parts by mass or less is preferable because heat resistant storage stability can be maintained, and image fogging is unlikely to occur.

Moreover, the amount of the crystalline polyester resin within the above-mentioned more preferable range is preferable because the resultant toner excels in both high image quality and low temperature fixability.

<Crosslinked Component>

One embodiment of the toner of the present disclosure includes a crosslinked component, where the crosslinked component includes a nonlinear polymer having 3 or more branches, terminals of which are metal ion crosslinked. The toner may further include other components according to the necessity.

Another embodiment of the toner of the present disclosure includes a crosslinked component, where the crosslinked component includes a THF insoluble component. The THF insoluble component includes at least THF insoluble component as a binder resin, and the THF insoluble component includes a nonlinear polymer having 3 or more branches and metal ions. The toner may further include other components according to the necessity.

<<Nonlinear Polymer>>

The nonlinear polymer for use in the present disclosure is obtained through a reaction between a nonlinear reactive precursor and a metal ion.

The metal ion crosslinking of the nonlinear polymer involves metal ions from metal salt, and does not urethane nor a urea group. Therefore, the nonlinear polymer has excellent chargeability.

<<<Nonlinear Reactive Precursor>>>

The nonlinear reactive precursor is not particularly limited, as long as the nonlinear reactive precursor is polyester including a group reactive with a metal ion (may be referred to as a prepolymer hereinafter) and may be appropriately selected depending on the intended purpose.

Examples of a group reactive with metal ions of the prepolymer include carboxylic acid.

The prepolymer is a nonlinear polymer. In the present specification, the term "nonlinear" means a branched structure formed by trivalent or higher alcohol, or trivalent or higher carboxylic acid, or both.

The trivalent or higher alcohol is not particularly limited and may be appropriately selected depending on the intended purpose. Examples thereof include trivalent or higher aliphatic alcohol, trivalent or higher polyphenols, and alkylene oxide adducts of trivalent or higher polyphenols.

The trivalent or higher aliphatic alcohol is not particularly limited and may be appropriately selected depending on the intended purpose. Examples thereof include glycerin, trimethylolethane, trimethylolpropane, pentaerythritol, and sorbitol.

The trivalent or higher polyphenols are not particularly limited and may be appropriately selected depending on the intended purpose. Examples thereof include trisphenol PA, phenol novolac, and cresol novolac.

The alkylene oxide adducts of trivalent or higher polyphenols are not particularly limited and may be appropriately selected depending on the intended purpose. Examples thereof include alkylene oxide (e.g., ethylene oxide, propylene oxide, and butylene oxide) adducts of trivalent or higher polyphenols.

The trivalent or higher carboxylic acid is not particularly limited and may be appropriately selected depending on the intended purpose. Examples thereof include trivalent or higher aromatic carboxylic acid. Moreover, anhydrides thereof, lower alkyl esters (the number of carbon atoms: from 1 through 3) thereof, or halogenated product thereof may be used.

The trivalent or higher aromatic carboxylic acid is preferably C9-C20 trivalent or higher aromatic carboxylic acid.

The C9-C20 trivalent or higher aromatic carboxylic acid is not particularly limited and may be appropriately selected depending on the intended purpose. Examples thereof include trimellitic acid, and pyromellitic acid.

Specific examples of the prepolymer include an isocyanate group-containing polyester resin.

<<<<Isocyanate Group-Containing Polyester Resin>>>>

The isocyanate group-containing polyester resin is not particularly limited and may be appropriately selected depending on the intended purpose. Examples thereof include a reaction product between an active hydrogen group-containing polyester resin and polyisocyanate. The reaction product can be used for a reaction with the below-described curing agent.

—Active Hydrogen Group-Containing Polyester Resin—

For example, the active hydrogen group-containing polyester resin is obtained through polycondensation between diol, dicarboxylic acid, and at least one of trivalent or higher alcohol and trivalent or higher carboxylic acid. The trivalent or higher alcohol and trivalent or higher carboxylic acid imparts a branch structure to the isocyanate group-containing polyester resin.

——Diol——

The diol used in the active hydrogen group-containing polyester resin is not particularly limited and may be appropriately selected depending on the intended purpose. Examples thereof include: aliphatic diol, such as ethylene glycol, 1,2-propylene glycol, 1,3-propylene glycol, 1,4-butanediol, 3-methyl-1,5-pentanediol, 1,6-hexanediol, 1,8-octanediol, 1,10-decanediol, and 1,12-dodecanediol; an oxyalkylene group-containing diol, such as diethylene glycol, triethylene glycol, dipropylene glycol, polyethylene glycol, polypropylene glycol, and polytetramethylene glycol; alicyclic diol, such as 1,4-cyclohexanedimethanol, and hydrogenated bisphenol alkylene oxide (e.g., ethylene oxide, propylene oxide, and butylene oxide) adducts of alicyclic diol; bisphenols, such as bisphenol A, bisphenol F, and bisphenol S; and alkylene oxide adducts of bisphenols, such as alkylene oxide (e.g., ethylene oxide, propylene oxide, and butylene oxide) adducts of bisphenols. Among the above-listed examples, C4-C12 aliphatic diol is preferable. The above-listed idols may be used alone or in combination.

——Dicarboxylic Acid——

The dicarboxylic acid used in the active hydrogen group-containing polyester resin is not, particularly limited and may be appropriately selected depending on the intended purpose. Examples thereof include aliphatic dicarboxylic acid, and aromatic dicarboxylic acid. Moreover, anhydrides thereof lower alkyl esters (the number of carbon atoms: from 1 through 3) thereof or halogenated product thereof may be used.

The aliphatic dicarboxylic acid is not particularly limited and may be appropriately selected depending on the intended purpose. Examples thereof include succinic acid, adipic acid, sebacic acid, dodecanedioic acid, maleic acid, and fumaric acid.

The aromatic dicarboxylic acid is not particularly limited and may be appropriately selected depending on the intended purpose. The aromatic dicarboxylic acid is preferably C8-C20 aromatic dicarboxylic acid.

The C8-C20 aromatic dicarboxylic acid is not particularly limited and may be appropriately selected depending on the intended purpose. Examples thereof include phthalic acid, isophthalic acid, terephthalic acid, and naphthalene dicarboxylic acid.

Among the aliphatic dicarboxylic acid, aromatic dicarboxylic acid, etc., the dicarboxylic acid used in the active hydrogen group-containing polyester resin is preferably C4-C12 aliphatic dicarboxylic acid. The above-listed dicarboxylic acids may be used alone or in combination.

——Trivalent or Higher Alcohol——

Since the trivalent or higher alcohol in the active hydrogen group-containing polyester resin is identical to those mentioned in the prepolymer, detailed description thereof is omitted.

——Trivalent or Higher Carboxylic Acid——

Since the trivalent or higher carboxylic acid in the active hydrogen group-containing polyester resin is identical to those mentioned in the prepolymer, detailed description thereof is omitted.

—Polyisocyanate—

The polyisocyanate is not particularly limited and may be appropriately selected depending on the intended purpose. Examples thereof include diisocyanate, and trivalent or higher isocyanate.

The diisocyanate is not particularly limited and may be appropriately selected depending on the intended purpose. Examples thereof include aliphatic diisocyanate, alicyclic diisocyanate, aromatic diisocyanate, aromatic aliphatic diisocyanate, isocyanurate, and products obtained by blocking the above-listed polyisocyanates with a phenol derivative, oxime, or caprolactam.

The aliphatic diisocyanate is not particularly limited and may be appropriately selected depending on the intended purpose. Examples thereof include tetramethylene diisocyanate, hexamethylene dilsocyanate, 2,6-diisocyanatocaproic acid methyl ester, octamethylene dilsocyanate, decamethylene diisocyanate, dodecamethylene diisocyanate, tetradecamethylene diisocyanate, trimethylhexane diisocyanate, and tetramethylhexane diisocyanate.

The alicyclic diisocyanate is not particularly limited and may be appropriately selected depending on the intended purpose. Examples thereof include isophorone diisocyanate, and cyclohexylmethane diisocyanate.

The aromatic diisocyanate is not particularly limited and may be appropriately selected depending on the intended purpose. Examples thereof include tolylene diisocyanate, diisocyanatodiphenyl methane, 1,5-naphthylenediisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanato-diphenyl ether.

The aromatic aliphatic diisocyanate is not particularly limited and may be appropriately selected depending on the intended purpose. Examples thereof include α,α,α',α'-tetramethylxylenediisocyanate.

The isocyanurate is not particularly limited and may be appropriately selected depending on the intended purpose. Examples thereof include tris(isocyanatalkyl)isocyanurate, and tris(isocyanatocycloalkyl)isocyanurate.

The above-listed polyisocyanates may be used alone or in combination.

—Curing Agent—

The curing agent is not particularly limited as long as the curing agent reacts with the prepolymer, and may be appropriately selected depending on the intended purpose. Examples thereof include an active hydrogen-containing compound.

——Active Hydrogen-Containing Compound——

An active hydrogen group in the active hydrogen-containing compound is not particularly limited and may be appropriately selected depending on the intended purpose. Examples thereof include a hydroxyl group (e.g., an alcoholic hydroxyl group and a phenolic hydroxyl group), an amino group, a carboxyl group, and a mercapto group. The above-listed examples may be used alone or in combination.

The active hydrogen-containing compound is not particularly limited and may be appropriately selected depending on the intended purpose. The active hydrogen group-containing compound is preferably amines because a urea bond can be formed.

The amines are not particularly limited and may be appropriately selected depending on the intended purpose. Examples thereof include diamine, trivalent or higher amine, amino alcohol, aminomercaptan, amino acid, and products obtained by blocking an amino group of the above-listed amines. The above-listed examples may be used alone or in combination. Among the above-listed examples, diamine, and a mixture of diamine and a small amount of trivalent or higher amine are preferable.

The diamine is not particularly limited and may be appropriately selected depending on the intended purpose.

Examples thereof include aromatic diamine, alicyclic diamine, and aliphatic diamine.

The aromatic diamine is not particularly limited and may be appropriately selected depending on the intended purpose. Examples of the aromatic diamine include phenylene diamine, diethyl toluene diamine, and 4,4'-diaminodiphenylmethane.

The alicyclic diamine is not particularly limited and may be appropriately selected depending on the intended purpose. Examples of the alicyclic diamine include 4,4'-diamino-3,3'-dimethyldicyclohexylmethane, diaminocyclohexane, and isophorone diamine.

The aliphatic diamine is not particularly limited and av be appropriately selected depending on the intended purpose. Examples of the aliphatic diamine include ethylenediamine, tetramethylenediamine, and hexamethylenediamine.

The trivalent or higher amine is not particularly limited and may be appropriately selected depending on the intended purpose. Examples of the trivalent or higher amine include diethylenetriamine, and triethylenetetramine.

Examples of the amino alcohol is not particularly limited and may be appropriately selected depending on the intended purpose. Examples of the amino alcohol include ethanolamine, and hydroxyethylaniline.

The aminomercaptan is not particularly limited and may be appropriately selected depending on the intended purpose. Examples of the aminomercaptan include aminoethylmercaptan, and aminopropylmercaptan.

The amino acid is not particularly limited and may be appropriately selected depending on the intended purpose. Examples of the amino acid include amino propionic acid, and amino caproic acid.

The products obtained by blocking the amino group are not particularly limited and may be appropriately selected depending on the intended purpose. Examples of the products obtained by blocking the amino group include ketimine compounds and oxazolidine compounds each obtained by blocking the amino group with ketones, such as acetone, methyl ethyl ketone, and methyl isobutyl ketone.

A molecular structure of the nonlinear polymer, such as the isocyanate group-containing polyester resin, can be confirmed by solution or solid NMR spectroscopy, X-ray diffraction spectroscopy, GC/MS, LC/MS, or IR spectroscopy. Example of the simple method thereof include a method where a compound that gives an infrared absorption spectrum not having absorption based on $\delta_{CH}$ (out plane bending) of olefin at 965±10 $cm^{-1}$ and 990±10 $cm^{-1}$ is detected as the nonlinear polymer, such as the isocyanate group-containing polyester resin.

The amount of the nonlinear polymer is not particularly limited and may be appropriately selected depending on the intended purpose. The amount of the nonlinear polyester is preferably from 50 parts by mass through 90 parts by mass, and more preferably from 70 parts by mass through 85 parts by mass, relative to 100 parts by mass of the toner.

The amount of the nonlinear polymer being 50 parts by mass or greater being preferable because low temperature fixability and hot offset resistance can be maintained.

The amount of the nonlinear polymer being 90 parts by mass or less is preferable because heat resistant storage stability, image glossiness and coloring degree obtained after fixing can be maintained.

The amount of the nonlinear polymer being within the above-mentioned more preferable range is preferable because the resultant toner excels in all of low temperature fixability, hot offset resistance, and heat resistant storage stability.

<<Metal Ions>>

As described above, the metal ions function as a crosslinking agent for crosslinking terminals of the nonlinear reactive precursor. In order to impart excellent fixability, the metal ions are preferable two or more different ions, and are each divalent or higher.

A method for crosslinking terminals of the reactive precursor with the metal ions is not particularly limited and may be appropriately selected depending on the intended purpose. Examples thereof include a method where a metal salt is added to ionic crosslink the metal salt with a terminal of the reactive precursor. The metal salt may be added to and dissolved in a solution in which the reactive precursor is dissolved to induce a crosslink reaction. Alternatively, an emulsion, in which a solution including the reactive precursor is dispersed in an aqueous medium, is prepared, and a metal salt is added and mix in the aqueous medium to induce a crosslink reaction.

The metal ion is not particularly limited and may be appropriately selected depending on the intended purpose. Examples thereof include a divalent metal ion, a trivalent metal ion, and a tetravalent metal ion.

The divalent metal ion is not particularly limited and may be appropriately selected depending on the intended purpose. Examples thereof include a magnesium ion, a calcium ion, and a strontium ion. Among the above-listed examples, a strontium ion is preferable.

The trivalent metal ion is not particularly limited and may be appropriately selected depending on the intended purpose. Examples thereof include an aluminium ion, a gallium ion, an indium ion, and a thallium ion. Among the above-listed examples, an aluminium ion is preferable.

When two or more different metal ions are included, the metal ions preferably have mutually different valencies in order to give different reaction speeds.

When two or more different metal ions are included, a difference in the ionic radius of the metal ions is preferably 50 pm or greater, more preferably from 55 pm through 120 pm, and even more preferably from 60 pm through 65 pm.

When the difference in the ionic radius of the metal ions is 50 pm or greater, reactivity increases, and both hot offset resistance and low temperature fixability can be achieved. Specifically, a distance between carboxyl groups (—COOH) to be reacted with metal ions increases, as the isocyanate group-containing polyester resin is increased. If metal ions having a large ionic radius are present there, the carboxyl groups and the meal ions tend to react with each other, and therefore a cross-linking reaction is facilitated. As a size of a reaction production increases due to crosslinking, meanwhile, steric hindrance increases. If metal ions having small ionic radius are present, however, the metal ions can be inserted into the gap in the three-dimensional structure of the polymer, and therefore a cross-linking reaction is further facilitated. As the reactivity increases, moreover, the isocyanate group-containing polyester resin can be also reacted with an amorphous resin. When the isocyanate group-containing polyester resin is reacted with the amorphous polyester resin, hot offset resistance and fixability of the toner of the present aspect can be improved.

A type of the metal ions in the nonlinear polymer of the present disclosure can be confirmed by quantitatively analyzing the THF soluble component in the toner through X-ray fluorescence spectrometry. In the present disclosure, for example, a qualitative analysis of the metal ions can be performed by means of X-ray fluorescence spectrometer ZSX Primus IV (available from RIGAKU CORPORATION).

A form of the THF insoluble component sample to be measured is not particularly limited, but a pellet or sheet of the THF insoluble component formed by a general press molding device is easy to handle. For example, the sample is placed in a pellet forming die having a diameter of 15 mm, and the pellet forming die with the sample is placed in a high temperature chamber a temperature of which is maintained to be equal to or higher than a glass transition temperature for about 1 hour. Immediately after that, the sample is pressed for 1 minute with load of 6 MPa, to thereby obtain a pellet of the THF insoluble component, which has a thickness of about 2 mm. The obtained pellet is placed in a sample holder of the X-ray fluorescence spectrometer, and the qualitative analysis is performed to detect metal elements included in the sample.

The glass transition temperature Tg of the nonlinear polymer of the present disclosure as measured by DSC is −60° C. or higher but lower than 0° C. The glass transition temperature Tg of the nonlinear polymer as measured by DSC is preferably a glass transition temperature $Tg_{2nd}$ at second heating of DSC.

Since the nonlinear polymer is amorphous polyester, there is no significant change in the value of a glass transition temperature Tg between the glass transition temperature $Tg_{1st}$ at the first heating of DSC and the glass transition temperature $Tg_{2nd}$ at the second heating of DSC. However, it is assumed that air etc. is included in the nonlinear polymer and the result may include noise when the glass transition temperature $Tg_{1st}$ at the first heating of DSC is measured, because the glass transition temperature Tg of the nonlinear polymer is generally measured by heating the bulk of the nonlinear polymer. When the glass transition temperature $Tg_{2nd}$ at the second heating of DSC is measured, hardly any air etc. is included in the nonlinear polymer, there is less noise, and therefore the measurement can be performed stably.

The glass transition temperature $Tg_{2nd}$ of the nonlinear polymer at second heating of DSC is, as described above, −60° C. or higher but lower than 0° C., more preferably from −50° C. through −10° C., and even more preferably from −40° C. through −20° C.

When the glass transition temperature $Tg_{2nd}$ of the nonlinear polymer at second heating of DSC is −60° C. or higher, problems that flow of the toner cannot be suppressed at a low temperature to degrade heat resistant storage stability, and filming resistance is degraded can be resolved. Therefore, such glass transition temperature $Tg_{2nd}$ is preferable.

When the glass transition temperature $Tg_{2nd}$ of the nonlinear polymer at second heating of DSC is lower than 0° C., problems that the toner cannot be sufficiently deformed by heat and pressure applied during fixing and low temperature fixability is insufficient can be resolved. Therefore, such glass transition temperature $Tg_{2nd}$ is preferable.

Since the crosslinked component in the toner of the present disclosure includes the nonlinear polymer as described above, and the nonlinear polymer is metal ion crosslinked with metal ions, the nonlinear polymer is a polymer that is in the form of a gel and is insoluble with tetrahydrofuran (THF). Accordingly, the glass transition temperature of the nonlinear polymer in the present disclosure can be confirmed by measuring the glass transition temperature of the THF insoluble component of the toner.

A method for obtaining the THF insoluble component of the toner of the present disclosure is not particularly limited and may be appropriately selected depending on the intended purpose. Examples thereof include a dissolution filtration method and a method for obtaining extraction residues using Soxhlet extraction.

In the present disclosure, for example, the THF insoluble component can be obtained by the below-described dissolution filtration method.

First, the toner is weighed and collected by 1 g. The collected toner is added to 100 mL of THF. The resultant is stirred by a stirrer for 6 hours at 25° C., to thereby obtain a solution in which the soluble component of the toner is dissolved. Next, the solution is passed through a membrane filter having an opening size of 0.2 μm. The filtration cake is again added to 50 mL of THF, and the resultant is stirred by a stirrer for 10 minutes. The above-mentioned series of processes is repeated twice or three times, and the obtained filtration cake is dried at 120° C. and 10 kPa or lower, to thereby obtain a THF insoluble component.

In the case where Soxhlet extraction is used, reflux is preferably performed for 6 hours or longer using 1 part of the toner and 100 parts of THF, to thereby separate into the THF insoluble component and the THF soluble component.

The weight average molecular weight of the nonlinear polymer is not particularly limited and may be appropriately selected depending on the intended purpose. The weight average molecular weight of the nonlinear polymer as measured by GPC is preferably from 20,000 through 1,000,000. The weight average molecular weight of the nonlinear polymer is a molecular weight of the reaction product obtained through a reaction between the nonlinear reactive precursor and the metal ions.

The nonlinear polymer having the weight average molecular weight of 20,000 or greater is preferable because the resultant toner does not fuse and flow at a low temperature, heat resistant storage stability is obtained, viscosity at melting is maintained at a favorable degree, and hot offset resistant can be obtained.

A molecular structure of the nonlinear polymer can be confirmed by solution or solid NMR spectroscopy, X-ray diffraction spectroscopy, GC/MS, LC/MS, or IR spectroscopy. Example of the simple method thereof include a method where a compound that gives an infrared absorption spectrum not having absorption based on $\delta_{CH}$ (out plane bending) of olefin at 965±10 $cm^{-1}$ and 990±10 $cm^{-1}$ is detected as the nonlinear polymer.

<<Other Components>>

Other components are not particularly limited and may be appropriately selected depending on the intended purpose. Examples thereof include a release agent, a colorant, a charge controlling agent, external additives, a flowability improving agent, a cleaning improving agent, and a magnetic material.

<<<Release Agent>>>

The release agent is not particularly limited and may be appropriately selected from release agents known in the art. Examples of the release agent (e.g., wax) include natural wax, such as vegetable wax (e.g., carnauba wax, cotton wax, Japanese wax, and rice wax), animal wax (e.g., bees wax and lanolin wax), mineral wax (e.g., ozocerite and ceresin), and petroleum wax (e.g., paraffin wax, microcrystalline wax, and petrolatum wax).

Moreover, the examples include, in addition to the above-listed natural wax, synthetic hydrocarbon wax (e.g., Fischer-Tropsch wax, polyethylene wax, and polypropylene wax), and synthetic wax (e.g., ester, ketone, and ether).

Furthermore, usable may be fatty acid amide-based compounds (e.g., 12-hydroxystearic acid amide, stearic acid amide, phthalimide anhydride, and chlorinated hydrocarbon), a low molecular-weight crystalline polyester resin, such as a homopolymer of polyacrylate poly-n-stearylmethacrylate, and poly-n-laurylmethacrylate) or copolymer thereof (e.g., n-stearylacrylate-ethylmethacrylate copolymer), and a crystalline polymer having a long alkyl chain at a side chain thereof.

Among the above-listed examples, hydrocarbon-based wax, such as paraffin wax, microcrystalline wax, Fischer-Tropsch wax, polyethylene wax, and polypropylene wax are preferable.

The melting point of the release agent is not particularly limited and may be appropriately selected depending on the intended purpose. The melting point of the release agent: is preferably from 60° C. through 80° C.

The release agent having the melting point of 60° C. or higher is preferable because the release agent does not easily melt at a low temperature, and heat resistant storage stability of the resultant toner can be obtained.

The release agent having the melting point of 80° C. or lower is preferable because, even when the resin is melted in the fixing temperature region, the release agent is sufficiently melted to prevent fixing offset, and image defects can be prevented.

An amount of the release agent is not particularly limited and may be appropriately selected depending on the intended purpose. The amount of the release agent is preferably from 2 parts by mass through 10 parts by mass, and more preferably from 3 parts by mass through 8 parts by mass, relative to 100 parts by mass of the toner.

The amount of the release agent being 2 parts by mass or greater is preferable because hot offset resistance during fixing and low temperature fixability can be obtained.

The amount of the release agent being 10 parts by mass or less is preferable because heat resistant storage stability is obtained and image fogging is unlikely to occur.

The amount of the release agent being within the above-mentioned more preferable range is preferable because of high image quality and improved fixing stability.

<<<Colorant>>>

The colorant is not particularly limited and may be appropriately selected depending on the intended purpose. Examples thereof include carbon black, a nigrosin dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, parared, filer red, parachloroorthonitro aniline red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

An amount of the colorant is not particularly limited and may be appropriately selected depending on the intended purpose. The amount of the colorant is preferably from 1 part by mass through 15 parts by mass, and more preferably from 3 parts by mass through 10 parts by mass, relative to 100 parts by mass of the toner.

The colorant may be also used as a master batch in which the colorant forms a composite with a resin. Examples of a resin used for production of the master batch (i.e., a resin for master batch) or a resin kneaded with the master batch include, in addition to amorphous polyester resins: polymers of styrene or substituted styrene, such as polystyrene, poly (p-chlorostyrene), and polyvinyl toluene; styrene-based copolymers, such as styrene-p-chlorostyrene copolymer, styrene-propylene copolymer, styrene-vinyl toluene copolymer, styrene-vinyl naphthalene copolymer, styrene-methacrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; an epoxy resin; an epoxy polyol resin; polyurethane; polyamide; polyvinyl butyral; polyacrylic resin; rosin; modified rosin; a terpene resin; aliphatic or alicyclic hydrocarbon resin; an aromatic petroleum resin; chlorinated paraffin; and paraffin wax. The above-listed examples may be used alone or in combination.

The master batch can be obtained by applying high shear force to a resin for a master batch and a colorant to mix and kneading the mixture. In order to enhance interaction between the colorant and the resin, an organic solvent can be used. Moreover, a so-called flashing method is preferably used, since a wet cake of the colorant can be directly used without being dried. The flashing method is a method in which an aqueous paste containing a colorant is mixed or kneaded with a resin and an organic solvent, and then the colorant is transferred to the resin to remove the moisture and the organic solvent. As for the mixing and kneading, a high-shearing disperser (e.g., a three-roll mill) is preferably used.

<<<Charge Controlling Agent>>>

The charge controlling agent is not particularly limited and may be appropriately selected depending on the intended purpose. Examples of the charge controlling agent include a nigrosine-based dye, a triphenylmethane-based dye, a chrome-containing metal complex dye, a molybdic acid chelate pigment, a rhodamine-based dye, alkoxy-based amine, a quaternary ammonium salt (including fluorine-modified quaternary ammonium), alkyl amide, phosphorus or a compound thereof, tungsten or a compound thereof, a fluorosurfactant, a metal salt of salicylic acid, and a metal salt of a salicylic acid derivative.

Specific examples thereof include: nigrosine dye BONTRON 03, quaternary ammonium salt BONTRON P-51, metal-containing azo dye BONTRON S-34, oxynaphthoic acid-based metal complex E-82, salicylic acid-based metal complex E-84 and phenol condensate E-89 (all manufactured by ORIENT CHEMICAL INDUSTRIES CO., LTD); quaternary ammonium salt molybdenum complex TP-302 and TP-415 (all manufactured by HODOGAYA CHEMICAL CO., LTD.); LRA-901, and boron complex LR-147 (manufactured by JAPAN CARLIT CO., LTD.); copper phthalocyanine; perylene; quinacridone; azo pigments; and other polymeric compounds having, as a functional group, a sulfonic acid group, carboxyl group, and quaternary ammonium salt.

An amount of the charge controlling agent is not particularly limited and may be appropriately selected depending on the intended purpose. The amount of the charge controlling agent is preferably from 0.1 parts by mass through 10 parts by mass, and more preferably from 0.2 parts by mass through 5 parts by mass, relative to 100 parts by mass of the toner.

The amount of the charge controlling agent being 10 parts by mass or less is preferable because appropriate chargeability of the toner is maintained and an effect of the charge controlling agent is obtained, appropriate electrostatic suction force with a developing roller is obtained, and reduction in flowability of a developer or image density can be prevented. The charge controlling agent may be melt-kneaded with a master batch or resin, followed by dissolving and dispersing in an organic solvent. Alternatively, the charge controlling agent may be directly added when other materials are dissolved and dispersed, or may be deposited and fixed on surfaces of toner base particles, after producing the toner base particles.

<<<External Additives>>>

The external additives are not particularly limited and may be appropriately selected depending on the intended purpose. Examples thereof include silica particles, hydrophobic silica, fatty acid metal salt (e.g., zinc stearate, and aluminium stearate), metal oxide (e.g., titania, alumina, tin oxide, and antimony oxide), and fluoropolymers. Among the above-listed examples, inorganic particles are preferable, and hydrophobicity-treated inorganic particles are more preferable.

Examples of the inorganic particles include silica, alumina, titanium oxide, barium titanate, magnesium titanate, calcium titanate, strontium titanate, iron oxide, copper oxide, zinc oxide, tin oxide, quartz sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitrate. Among the above-listed examples, silica, and titanium dioxide are preferable.

The average particle diameter of the primary particles of the inorganic particles is not particularly limited and may be appropriately selected depending on the intended purpose. The average particle diameter thereof is preferably 100 nm or less, and more preferably 3 nm or greater but 70 nm or less.

When the average particle diameter of the primary particles of the inorganic particles is within the above-mentioned range, the inorganic particles are prevented from being embedded in the toner base particles, a function of the inorganic particles is effectively exhibited, and a surface of a photoconductor is prevented from being unevenly damaged.

The hydrophobicity-treated inorganic particles are not particularly limited and may be appropriately selected depending on the intended purpose. For example, the hydrophobicity-treated inorganic particles are preferably hydrophobicity-treated silica particles, hydrophobicity-treated titania particles, hydrophobicity-treated titanium oxide particles, or hydrophobicity-treated alumina particles.

The above-listed examples may be used alone or in combination.

Examples of the silica particles include R972, R974, RX200, RY200, R202, R805, and R812 (all available from NIPPON AEROSIL CO., LTD.).

Examples of the titania particles include: P-25 (available from NIPPON AEROSIL CO., LTD.); STT-30, and STT-65C-S (both available from TITAN KOGYO. LTD.); TAF-140 (available from Fuji Titanium Industry Co., Ltd.); and MT-150 W, MT-500B, MT-600B, and MT-150A (all available from TAYCA CORPORATION).

Examples of the hydrophobic-treated titanium oxide particles include: T-805 (available from NIPPON AEROSIL CO., LTD.); STT-30A and STT-65S-S (both available from Titan Kogyo, Ltd.); TAF-500T and TAF-1500T (both available from FUJI TITANIUM INDUSTRY CO., LTD.); MT-100S and MT-100T (both available from TAYCA CORPORATION); and IT-S (available from ISHIHARA SANGYO KAISHA, LTD.).

The hydrophobicity treatment is performed, for example, by treating hydrophilic particles with a silane coupling agent, such as methyltrimethoxysilane, methyltriethoxysilane, and octyltrimethoxysilane.

Moreover, silicone oil-treated oxide particles, or silicone oil-treated inorganic particles obtained by treating inorganic particles with silicone oil are also suitably used.

When the silicone oil is used, a treatment may be optionally performed with applying heat.

The silicone oil is not particularly limited and may be appropriately selected depending on the intended purpose. Examples thereof include dimethyl silicone oil, methylphenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, methacryl-modified silicone oil, and α-methylstyrene-modified silicone oil.

An amount of the external additives is not particularly limited and may be appropriately selected depending on the intended purpose. The amount of the external additives is preferably from 0.1 parts by mass through 5 parts by mass, and more preferably from 0.3 parts by mass through 3 parts by mass, relative to 100 parts by mass of the toner.

As the external additives, the oxide particles may be used in combination with inorganic particles or hydrophobicity-treated inorganic particles.

Among the hydrophobicity-treated inorganic particles, the hydrophobicity-treated inorganic particles having the average primary particle diameter of from 1 nm through 100 nm are preferable, and the hydrophobicity-treated inorganic particles having the average primary particle diameter of from 5 nm through 70 nm are more preferable.

The external additives preferably include at least one group of the hydrophobicity-treated inorganic particles having the average primary particle diameter of 20 nm or less and at least one group of the inorganic particles having the average primary particle diameter of 30 nm or greater.

The BET specific surface area of the external additives is preferably from 20 $m^2/g$ through 500 $m^2/g$.

<<<Flowability Improving Agent>>>

The flowability improving agent is not particularly limited and may be appropriately selected depending on the intended purpose, as long as the flowability improving agent is an agent used to perform a surface treatment to increase hydrophobicity to prevent degradation of flowability and charging properties even in high humidity environment. Examples of the flowability improving agent include a silane coupling agent, a silylation agent, a silane-coupling agent containing a fluoroalkyl group, an organic titanate-based coupling agent, an aluminum-based coupling agent, silicone oil, and modified-silicone oil.

The silica and the titanium oxide are particularly preferably subjected to a surface treatment with any of the above-listed flowability improving agents to be used as hydrophobic silica and hydrophobic titanium oxide.

<<<Cleaning Improving Agent>>>

The cleaning improving agent is not particularly limited and may be appropriately selected depending on the intended purpose, as long as the cleaning improving agent is an agent added to the toner in order to remove a developer remained on a photoconductor or a primary transfer member after transferring. Examples of the cleaning improving agent include: fatty acid (e.g., stearic acid) metal salts, such as zinc stearate, and calcium stearate; and polymer particles produced by soap-free emulsification polymerization, such as polymethyl methacrylate particles, and polystyrene particles.

The polymer particles are preferably polymer particles having a relatively narrow particle size distribution. The volume average particle diameter thereof is more preferably from 0.01 μm through 1 μm.

<<<Magnetic Material>>>

The magnetic material is not particularly limited and may be appropriately selected depending on the intended purpose. Examples of the magnetic material include iron powder, magnetite, and ferrite. Among the above-listed examples, white magnetic materials are preferable in view of color tone.

The glass transition temperature $Tg_{1st}$ of the toner of the present aspect at the first heating of DSC may be from 20° C. through 40° C. A toner known in the art generally has a glass transition temperature Tg of higher than 40° C. and has relatively a high glass transition temperature Tg. If a toner known in the art has a glass transition temperature Tg of 0° C. or lower, for example, toner particles tend to aggregate due to transportation of the toner at high temperatures, such as during summer or in a tropic area, and fluctuations of a temperature in a storage environment. As a result, a toner may be solidified inside a toner bottle, or adhesion of toner particles may occur inside a developing device. Moreover, defected images may be formed due to toner supply failures caused by clogging of the toner in the toner bottle, and adhesion of the toner particles inside the developing device.

The toner of the present aspect has a glass transition temperature $Tg_{1st}$ of from 20° C. through 40° C., which is lower than a glass transition temperature Tg of a toner in the art. However, the polymer included in the toner of the present aspect is a nonlinear polymer, and therefore the toner can maintain heat resistant storage stability as well as keeping the glass transition temperature $Tg_{1st}$ low.

The toner of the present aspect having the glass transition temperature $Tg_{1st}$ of 20° C. or higher is preferable because heat resistant storage stability of the toner is maintained, and blocking inside a developing device and toner filming on a photoconductor can be prevented.

The toner of the present aspect having the glass transition temperature $Tg_{1st}$ of 40° C. or lower is preferable because the toner can exhibit low temperature fixability.

Moreover, a difference ($Tg_{1st}-Tg_{2nd}$) of the glass transition temperature $Tg_{1st}$ of the toner of the present aspect and the glass transition temperature $Tg_{2nd}$ thereof at the second heating of DSC is not particularly limited and may be appropriately selected depending on the intended purpose. The difference thereof is preferably 10° C. or greater. The upper limit of the difference ($Tg_{1st}-Tg_{2nd}$) is not particularly limited and may be appropriately selected depending on the intended purpose. The upper limit thereof is preferably 50° C. or less.

The difference ($Tg_{1st}-Tg_{2nd}$) being 10° C. or greater is preferable because excellent low temperature fixability can be achieved. The difference ($Tg_{1st}-Tg_{2nd}$) being 10° C. or greater means that the crystalline polyester resin and the amorphous polyester resin, which are present in an incompatible state before heating (before first heating) are turned into a compatible state after heating (after first heating). The compatible state after heating does not need to be a completely compatible state.

A melting point of the toner of the present embodiment is not particularly limited and may be appropriately selected depending on the intended purpose. The melting point thereof is preferably from 60° C. through 80° C.

An amount of the tetrahydrofuran (THF) insoluble component in the toner of the present embodiment is not particularly limited and may be appropriately selected depending on the intended purpose. The amount thereof is preferably from 15% by mass through 35% by mass, and more preferably from 20% by mass through 30% by mass.

When the amount of the THF insoluble component is 15% by mass or greater, low temperature fixability can be secured. When the amount of the THF insoluble component is 35% by mass or less, heat resistant storage stability can be secured. Therefore, the amount of the THF insoluble component being the above-mentioned range is preferable.

The amount of the THF insoluble component in the toner of the present disclosure can be measured by weighing the THF insoluble component obtained through Soxhlet extraction of the toner using an electronic scale, and can be determined according to the following formula (1).

$$(\text{Amount of THF insoluble component (g)}/\text{amount of toner before extraction (g)})\times 100 \quad \text{Formula (1)}$$

The THF insoluble component corresponds to a nonlinear amorphous polyester resin. The toner of the present aspect has a low glass transition temperature Tg compared to toners of related art, but the toner of the present aspect can maintain sufficient heat resistance storage stability, because the toner includes the predetermined amount of the THF insoluble component.

The volume average particle diameter of the toner of the present disclosure is not particularly limited and may be appropriately selected depending on the intended purpose. The volume average particle diameter thereof is preferably from 3 μm through 7 μm.

A ratio Dv/Dn of the volume average particle diameter Dv of the toner of the present disclosure to the number average particle diameter Dn of the toner of the present disclosure is preferably 1.2 or less.

The toner of the present disclosure preferably includes 1% by number or greater but 10% by number or less of the toner base particles having the volume average particle diameter of 2 μm or less.

<Calculation Methods and Analysis Methods of Various Properties of Toner and Toner Constitutional Components>

The glass transition temperature Tg, acid value, hydroxyl value, molecular weight, and melting point of the amorphous polyester resin, the crystalline polyester resin, and the release agent may be measured by performing each measurement on each material. Alternatively, GPC etc. may be performed on the toner to separate into components, and each of the separated components is subjected to the below-described analysis to calculate a constitutional monomer ratio, a melting point, and a glass transition temperature Tg.

For example, separation of components by GPC can be performed by the following method, (1) in GPC using tetrahydrofuran (THF) as a mobile phase, the eluate is separated by a fraction collector etc., and the fractions are combined to correspond to a desired molecular weight region among the entire area of the elution curve (2) After concentrating and drying the combined eluate by an evaporator etc., the solids are dissolved in a deuterated solvent, such as deuterochloroform and deuterated THF, 1H-NMR is performed thereon, and a constitutional monomer ratio of the resin in the eluted component is calculated from an integrated ratio of each element.

(3) As another method, moreover, after concentrating the eluate, hydrolysis is performed using sodium hydroxide etc., the decomposed product is subjected to a qualitative and quantitative analysis through high performance liquid chromatography (HPLC) to calculate a constitutional monomer ratio.

<<Separation Method of Toner Constitutional Component>>

One example of a separation method of each component when the toner of the present aspect is analyzed will be described in detail.

First, 1 g of the toner is added to 100 mL of THF. The resultant is stirred for 30 minutes at 25° C. to thereby obtain a solution in which a THF soluble component is dissolved. Subsequently, the solution is filtered with a membrane filter having an opening size of 0.2 μm, to thereby obtain a THF soluble component of the toner. Next, the THF soluble component is dissolved in THF, and the resultant is injected as a sample for GPC into GPC used for measuring a molecular weight of each of the above-mentioned resins.

Meanwhile, a fraction collector is disposed at the eluate output of GPC, and the eluate is separated per the predetermined count to thereby obtain an eluate per 5% of an image area from the elution onset of the elution curve (rise of the curve).

Subsequently, 30 mg of each elution fraction as a sample is dissolved in 1 mL of deuterochloroform, and 0.05% by volume of tetramethyl silane (TMS) is added as a standard material. A glass tube for NMR having a diameter of 5 mm is charged with the resultant solution, and a measurement is performed by means of a nuclear magnetic resonance spectrometer (JNM-AL400, available from JEOL Ltd.) at a temperature of from 23° C. through 25° C., with integrations of 128 times, to thereby obtain a spectrum. The monomer composition, constitutional ratio of the amorphous polyester resin, crystalline polyester resin, etc. included in the toner are determined from a peak integration ratio of the obtained spectrum. For example, the peaks are assigned as follows, and a component ratio of each constitutional monomer is determined from the integration ratio.

—Assignment of Peaks—

Near 8.25 ppm: derived from a benzene ring of trimellitic acid (one hydrogen atom)

From near 8.07 ppm through near 8.10 ppm: derived from a benzene ring of terephthalic acid (four hydrogen atoms)

From near 7.1 ppm through near 7.25 ppm: derived from a benzene ring of bisphenol A (four hydrogen atoms)

Near 6.8 ppm: derived from a benzene ring of bisphenol A (four hydrogen atoms) and derived from a double bond of fumaric acid (two hydrogen atoms)

From near 5.2 ppm through near 5.4 ppm: derived from methine of a bisphenol A propylene oxide adduct (one hydrogen)

From near 3.7 ppm through near 4.7 ppm: derived from methine of a bisphenol A propylene oxide adduct (two hydrogen atoms) and derived from methane of a bisphenol A ethylene oxide adduct (four hydrogen atoms)

Near 1.6 ppm: derived from a methyl group of bisphenol A (six hydrogen atoms)

From the results above, for example, the extract collected in the fraction in which the amorphous polyester resin occupies 90% or greater may be determined as an amorphous polyester resin. Similarly, the extract collected in the fraction in which the crystalline polyester resin occupies 90% or greater may be determined as a crystalline polyester resin.

<<Measurement Method of Inciting Point and Glass Transition Temperature Tg>>

A melting point and glass transition temperature Tg of the separated component are measured, for example, by means of a DSC system (differential scanning calorimeter) (Q-200, available from TA INSTRUMENTS INC.). Specifically, a melting point and glass transition temperature of a sample can be measured in the following manner.

First, a sample container formed of aluminium is charged with about 5.0 mg of a sample, the sample container is placed on a holder unit, and the holder unit is set in an electric furnace. Next, the sample is heated from −80° C. to 150° C. at the heating rate of 1.0° C./min in a nitrogen atmosphere (first heating). Then, the sample is cooled from 150° C. to −80° C. at the cooling rate of 10° C./min, followed by again heating to 150° C. at the heating rate of 10° C./min (second heating). DSC curves for the first heating and the second heating are each measured by means of a differential scanning calorimeter (Q-200, available from TA INSTRUMENTS INC.).

The DSC curve for the first heating is selected from the obtained DSC curves using an analysis program installed in the Q-200 system, and a glass transition temperature $Tg_{1st}$ of the sample at the first heating is determined. Similarly, the DSC curve at the second heating is selected, and a glass transition temperature $Tg_{2nd}$ of the sample at the second heating is determined.

The DSC curve for the first heating is selected from the obtained DSC curves using an analysis program installed in the Q-200 system, and the endothermic peak top temperature of the sample at the first heating is determined as a melting point. Similarly, the DSC curve at the second heating is selected, and an endothermic peak top temperature of the sample at the second heating is determined as a melting point.

In the present specification, when the toner is used as a sample, the glass transition temperature at the first heating is determined as the glass transition temperature $Tg_{1st}$, and the glass transition temperature at the second heating is determined as the glass transition temperature $Tg_{2nd}$.

In the present specification, moreover, as a melting point and glass transition temperature Tg of other constitutional components, such as a nonlinear polymer, a binder resin, a crystalline polyester resin, and a release agent, the endothermic peak top temperature and the glass transition temperature $Tg_{2nd}$ at the second heating are determined as a melting point and glass transition temperature Tg of each component, unless otherwise stated.

As described above, one embodiment of the toner of the present disclosure includes the crosslinked component, where the crosslinked component includes 3 or more branches, terminal of which are metal ion crosslinked, and the nonlinear polymer has a glass transition temperature Tg of −60° C. or higher but lower than 0° C. Moreover, one embodiment of the toner of the present disclosure includes a crosslinked component, where the crosslinked component includes a tetrahydrofuran (THF) insoluble component as a binder resin, the THF insoluble component includes a nonlinear polymer having 3 or more branches, and metal ions, and a glass transition temperature Tg of the nonlinear polymer as measured by differential scanning calorimetry is −60° C. or higher but lower than 0° C.

Since the nonlinear polymer of the present disclosure has an extremely low glass transition temperature Tg, the nonlinear polymer deforms at a low temperature. Accordingly, the nonlinear polymer easily forms by heat and pressure applied during fixing, and therefore a resultant toner is easily in contact with a recording medium, such as paper, at the lower temperature. Moreover, the nonlinear polymer is a nonlinear reactive precursor and has a branched structure in a molecular skeleton thereof, and a molecular chain of the nonlinear polymer has a three-dimensional network structure. Therefore, the nonlinear polymer can exhibit rubber-like behaviors that the nonlinear polymer deforms but does not flow at a low temperature, and a quantity of electric charge can be increased.

Moreover, metal ion crosslinks are formed at terminal of the crosslinked component of the present disclosure with metal ions, and therefore fixability is maintained. Furthermore, a quantity of electric charge of the toner of the present aspect is increased, and therefore adhesion of the toner to a recording medium, such as paper, and a member inside a developing device can be suppressed. When the toner is fixed on a surface of a sheet, and output sheets are stacked on a paper ejection tray, therefore, blocking is prevented. The blocking is a phenomenon that the toner is adhered to a recording medium and is caused by pressure applied by the weight of the stacked recording media and remaining heat from fixing. Moreover, the toner is easily removed by a cleaning blade.

Accordingly, the toner of the present aspect has excellent chargeability, has low adhesion force, and can achieve both low temperature fixability and hot offset resistance. Accordingly, the toner of the present aspect has excellent chargeability, low temperature fixability, hot offset resistance, and blocking resistance after fixing.

In the toner of the present aspect, the metal ion crosslink of the nonlinear polymer may include two or more divalent or higher metal ions. As a result, the crosslinked component is easily fit with a recording medium. Therefore, the toner of present aspect can improve fixability.

In the toner of the present aspect, the two divalent or higher metal ions included in the metal ion crosslink of the nonlinear polymer may have mutually different valencies. As a result, the quantity of electric charge of the metal ions forming metal ion crosslinks at the terminal of the crosslinked component can be made large, and therefore the toner of the present aspect can exhibit excellent chargeability.

In the toner of the present aspect, a difference in an ionic radius between the two divalent or higher metal ions included in the metal ion crosslink of the nonlinear polymer may be 50 pm or greater. The network structure of the crosslinked component can be easily made a complicated three-dimensional structure by setting a difference in the size between the two metal ions metal ion crosslinked at the terminals of the crosslinked component large. Therefore, the toner of the present aspect has excellent chargeability, low temperature fixability, hot offset resistance, and blocking resistance.

(Resin Particles)

The resin particles of the present disclosure each include a crosslinked component, where the crosslinked component includes at least a tetrahydrofuran (THF) insoluble component as a binder resin, the THF insoluble component includes a nonlinear polymer having 3 or more branches and metal ions, and a glass transition temperature Tg of the THF insoluble component as measured by differential scanning calorimetry is −60° C. or higher but lower than 0° C.

The components and measurement methods of the resin particles are identical to those described in the toner, and therefore description thereof is omitted.

(Method for Producing Toner)

According to one aspect, the method for producing a toner preferably includes a granulating step. The granulating step includes dispersing, in an aqueous medium, an oil phase including a nonlinear polymer and a crystalline polyester resin, and optionally a release agent, a colorant, etc. to granulate to thereby form toner base particles.

In the granulating step of the method for producing a toner of the present aspect, a prepolymer, which is a nonlinear reactive precursor, is used instead of the nonlinear polymer, and the oil phase further including a curing agent may be used. The oil phase including the prepolymer and the aqueous medium are mixed, and an elongation reaction and/or cross-linking reaction of the prepolymer and the curing agent is performed to form toner base particles with generating a nonlinear polymer, as well generating an amorphous polyester resin.

In the granulating step of the method for producing a toner of the present aspect, moreover, a prepolymer, which is a nonlinear reactive precursor, is used instead of the nonlinear polymer, and the oil phase further including an active hydrogen-containing compound and a curing agent may be used. The oil phase including the prepolymer that is the nonlinear reactive precursor and the active hydrogen-containing compound is mixed with the aqueous medium to form toner base particles with generating a nonlinear polymer through an elongation reaction and/or cross-linking reaction between the prepolymer and the curing agent.

In the granulating step of the method for producing a toner of the present aspect, furthermore, a prepolymer, which is a nonlinear reactive precursor, is used instead of the nonlinear polymer, and the oil phase, in which the polyester resin and the prepolymer are dissolved or dispersed in a solvent, may be subjected to phase-transfer emulsification. After the phase-transfer emulsification of the oil phase and removal of the organic solvent, the resultant is mixed with a dispersion liquid including a crystalline polyester resin to prepare a mixed solution, and the crystalline polyester resin particles in the mixed solution are aggregated to form toner base particles.

As the method for producing a toner, for example, a dissolution suspension method, or an emulsification aggregation method may be used.

Examples of the method for producing a toner using the dissolution suspension method include a method where an elongation reaction and/or a cross-linking reaction of a prepolymer, which is a nonlinear reactive precursor, and metal ions is performed to form toner base particles with elongating the nonlinear polymer.

The method for producing toner base particles using the dissolution suspension method include a step for preparing an aqueous dispersion liquid of a crystalline polyester resin (a crystalline polyester resin dispersion liquid) (a crystalline polyester resin dispersion liquid preparing step), a step for preparing an aqueous medium (an aqueous medium preparing step), a step for preparing an oil phase including toner materials (an oil phase preparing step), a step for emulsifying or dispersing the toner materials (an emulsification or dispersion step, and a step for removing an organic solvent (an organic solvent removal step). The method may further include other steps according to the necessity.

<Crystalline Polyester Resin Dispersion Liquid Preparation Step>

The crystalline polyester resin dispersion liquid is preferably prepared by a phase-transfer emulsification method. The phase-transfer emulsification is a method where an organic solvent, a neutralizing agent, a surfactant etc. are added to a resin according to the necessity, the resultant mixture is added to an aqueous medium by dripping with stirring to obtain emulsified particles, and the organic solvent is removed from the resin dispersed liquid, to thereby obtain an emulsified liquid. Optionally, heating can be performed.

The organic solvent used in the phase-transfer emulsification method is not particularly limited and may be appropriately selected depending on the intended purpose. Examples thereof include methanol, ethanol, propanol, IPA, butanol, ethyl acetate, MEK, and any combination thereof. Among the above-listed examples, an organic solvent having a boiling point of lower than 150° C. is preferable because the organic solvent can be easily removed.

The neutralizing agent is not particularly limited and may be appropriately selected depending on the intended purpose. For example, general acid or alkali, such as nitric acid, hydrochloric acid, sodium hydroxide, and ammonia may be used.

The surfactant used in the crystalline polyester resin dispersion liquid preparation step is not particularly limited and may be appropriately selected depending on the intended purpose. For example, the surfactant may be selected from ionic surfactants or nonionic surfactants. The ionic surfactants include anionic surfactants and cationic surfactants. The above-listed examples may be used alone or in combination.

A method for removing the organic solvent is not particularly limited and may be appropriately selected depending on the intended purpose. Examples thereof include: a method where the entire reaction system is gradually heated to evaporate oil droplets; and a method where a dispersion liquid is sprayed in a dry atmosphere to remove an organic solvent from oil droplets.

<Aqueous Medium Preparation Step>

For example, the aqueous medium (aqueous phase) can be prepared by dispersing resin particles in an aqueous medium.

An amount of the resin particles in the aqueous medium is not particularly limited and may be appropriately selected depending on the intended purpose. The amount of the resin particles is preferably from 0.5 parts by mass through 10 parts by mass, relative to 100 parts by mass of the aqueous medium.

The aqueous medium is not particularly limited and may be appropriately selected depending on the intended purpose. Examples of the aqueous medium include a water, a solvent miscible with water, and a mixture thereof. The above-listed examples may be used alone or in combination. Among the above-listed examples, water is preferable.

The solvent miscible with water is not particularly limited and may be appropriately selected depending on the intended purpose. Examples thereof include alcohol, lower ketones, dimethylformamide, tetrahydrofuran, and cellosolves.

The alcohol is not particularly limited and may be appropriately selected depending on the intended purpose. Examples thereof include methanol, isopropanol, and ethylene glycol.

The lower ketones are not particularly limited and may be appropriately selected depending on the intended purpose. Examples thereof include acetone, and methyl ethyl ketone.

<Oil Phase Preparation Step>

The oil phase including the toner materials can be prepared by dissolving or dispersing, in an organic solvent, toner materials including a nonlinear reactive precursor, an amorphous polyester resin, and a crystalline polyester resin, optionally a curing agent, a release agent, and a colorant.

The organic solvent used in the oil phase preparation step is not particularly limited and may be appropriately selected depending on the intended purpose. The organic solvent is preferably an organic solvent having a boiling point of lower than 150° C. because the organic solvent is easily removed.

The organic solvent having a boiling point of lower than 150° C. is not particularly limited and may be appropriately selected depending on the intended purpose. Examples thereof include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. The above-listed examples may be used is alone or in combination.

Among the above-listed examples, ethyl acetate, toluene, xylene, benzene, methylene chloride, 1,2-dichloroethane, chloroform, and carbon tetrachloride are preferable, and ethyl acetate is more preferable.

<Emulsifying and Dispersing Steps>

Emulsifying or dispersing can be performed by dispersing the oil phase including the toner materials in an aqueous medium to emulsify or disperse the toner materials. When the toner materials are emulsified or dispersed, the metal ions and the nonlinear reactive precursor are allowed to react through an elongation reaction, or a cross-linking reaction, or both, to thereby generate a nonlinear polymer.

For example, the nonlinear polymer can be generated by the following methods (1) and (2).

(1) The oil phase including the nonlinear reactive precursor and the metal ions is emulsified or dispersed in the aqueous medium, and the metal ions and the nonlinear reactive precursor are allowed to react in the aqueous medium through an elongation reaction and/or a cross-linking reaction, to thereby generate a nonlinear polymer.

(2) The oil phase including the nonlinear reactive precursor is emulsified or dispersed in the aqueous medium, to which the metal ions are added in advance, and the curing agent and the nonlinear reactive precursor are allowed to react in the aqueous medium through an elongation reaction and/or a cross-linking reaction, to thereby generate a nonlinear polymer.

The reaction time for generating the nonlinear polymer is not particularly limited and may be appropriately selected depending on the intended purpose. The reaction time is preferably from 10 minutes through 40 hours, and more preferably from 2 hours through 24 hours.

The reaction temperature for generating the nonlinear polymer is not particularly limited and may be appropriately selected depending on the intended purpose. The reaction temperature is preferably from 0° C. through 150° C., and more preferably from 40° C. through 98° C.

A method for stably forming dispersed elements each including the nonlinear reactive precursor in the aqueous medium is not particularly limited and may be appropriately selected depending on the intended purpose. Examples thereof include a method where an oil phase prepared by dissolving or dispersing toner materials is added to an aqueous medium, and the resultant mixture is dispersed by applying shearing force.

A disperser used for the dispersing is not, particularly limited and may be appropriately selected depending on the intended purpose. Examples thereof include a low-speed shearing disperser, a high-speed shearing disperser, a friction disperser, a high-pressure jet disperser, and an ultrasonic disperser.

Among the above-listed examples, a high-speed shearing disperser is preferable because particle diameters of dispersed elements (oil droplets) can be controlled to the range of from 2 μm through 20 μm.

In the case where the high-speed shearing disperser is used, the conditions thereof, such as rotational speed, duration of dispersion, and a dispersion temperature, are appropriately selected depending on the intended purpose.

The rotational speed of the high-speed shearing disperser is not particularly limited and may be appropriately selected depending on the intended purpose. The rotational speed thereof is preferably from 1,000 rpm through 30,000 rpm, and more preferably from 5,000 rpm through 20,000 rpm.

The duration of dispersion by the high-speed shearing disperser is not particularly limited and may be appropriately selected depending on the intended purpose. In case of a batch system, the duration of the dispersion is preferably from 0.1 minutes through 5 minutes.

The dispersion temperature of the high-speed shearing disperser is not particularly limited and may be appropriately selected depending on the intended purpose. The dispersion temperature is preferably from 0° C. through 150° C., and more preferably from 40° C. through 98° C. under pressure. Generally, dispersing is easily performed when the dispersing temperature is a high temperature.

An amount of the aqueous medium used when the toner materials are emulsified or dispersed is not particularly limited and may be appropriately selected depending on the intended purpose. The amount thereof is preferably from 50 parts by mass through 2,000 parts by mass, and more preferably from 100 parts by mass through 1,000 parts by mass, relative to 100 parts by mass of the toner materials.

The amount of the aqueous medium being 50 parts by mass or greater is preferable because the toner materials are stably dispersed, and toner base particles having the predetermined particle diameters can be obtained.

The amount of the aqueous medium being 2,000 parts by mass or less is preferable because the production cost can be kept low.

When the oil phase including the toner materials is emulsified or dispersed, a dispersing agent is preferably used for the purpose of stabilizing dispersed elements, such as oil droplets, and forming the dispersed elements into a desired shape, and making the particle size distribution of the dispersed element sharp.

The dispersing agent is not particularly limited and may be appropriately selected depending on the intended purpose. Examples thereof include a surfactant, a poorly water-soluble inorganic compound dispersing agent, and a polymer-based protective colloid. The above-listed examples may be used alone or in combination. Among the above-listed examples, a surfactant is preferable.

The surfactant used as the dispersing agent is not particularly limited and may be appropriately selected depending on the intended purpose. For example, an anionic surfactant, a cationic surfactant, a nonionic surfactant, or an amphoteric surfactant can be used as the surfactant.

The anionic surfactant is not particularly limited and may be appropriately selected depending on the intended purpose. Examples thereof include alkyl benzene sulfonic acid salt, α-olefin sulfonic acid salt, and phosphoric acid ester. Among the above-listed examples, a surfactant including a fluoroalkyl group is preferable.

<Organic Solvent Removing Step>

The organic solvent is removed from the dispersion liquid, such as emulsified slurry, to obtain toner base particles.

A method for removing the organic solvent from the dispersion liquid is not particularly limited and may be appropriately selected depending on the intended purpose. Examples thereof include: a method where the entire reaction system is gradually heated to evaporate the organic solvent in the oil droplets; and a method where the dispersion liquid is sprayed in a dry atmosphere to remove the organic solvent in the oil droplets.

Once the organic solvent is removed, toner base particles are formed.

Washing, drying, etc. may be performed on the toner base particles, and moreover classification may be performed on the toner base particles.

The classification may be performed by removing a fine particle component by cyclone in a liquid, a decanter, or centrifugation. Alternatively, the classification may be performed after drying.

<External Additive Step>

Moreover, the obtained toner base particles may be mixed with external additives, charge controlling agent, etc. During the mixing, mechanical impact may be applied to prevent particles, such as the external additives, from falling off from surfaces of the toner base particles.

Subsequently, the resultant is passed through a sieve having 250-mesh or finer to remove coarse particles or aggregated particles, to thereby obtain a toner of the present embodiment.

A method for applying mechanical impact is appropriately selected depending on the intended purpose. Examples thereof include: a method where impact is applied to the mixture using a blade that is rotated at high speed; and a method where the mixture is added in a high-speed air flow to accelerate to allow the particles to crush with one another, or against a collision plate.

A device used for applying the mechanical impact is not particularly limited and may be appropriately selected depending on the intended purpose. Examples thereof include an angmill (available from HOSOKAWA MICRON CORPORATION), a device obtained by modifying an I-type mill (available from NIPPON PNEUMATIC MFG. CO., LTD.) to reduce pulverization air pressure, a hybridization system (available from NARA MACHINERY CO., LTD.), Kryptron System (available from KAWASAKI HEAVY INDUSTRIES, LTD.), and an automatic mortar.

(Developer)

The developer of the present embodiment include the toner of the present embodiment, and may further include appropriately selected other components, such as a carrier. Therefore, the developer of the present embodiment can achieve excellent chargeability, low temperature fixability, and hot offset resistance, and can form an excellent image with blocking resistance after fixing.

The developer may be a one-component developer or a two-component developer. In the case where the developer is used for a high-speed printer corresponding to a recent improvement of information processing speed, use of a two-component developer is preferable in view of an improvement of service life.

When the toner of the present embodiment is used as a one-component developer, there is no or slight change in the particle diameter of the toner even after consuming and refilling the toner, filming of the toner to a developing roller or fusion of the toner to a member, such as a blade for thinning a layer of the toner, is rarely caused, and excellent and stable developing properties and images are obtained even the developer is stirred for a long period in a developing device.

When the toner of the present embodiment is used for a two-component developer, the toner is mixed with a carrier, and the mixture is used as a developer.

When the developer is used as a two-component developer, there is no or slight change in the particle diameter of the toner even after consuming and refilling the toner, and excellent and stable developing properties and images are obtained even the developer is stirred for a long period in a developing device.

An amount of the carrier in the two-component developer may be appropriately selected depending on the intended purpose. The amount thereof is preferably from 90 parts by mass through 98 parts by mass, and more preferably from 93 parts by mass through 97 parts by mass, relative to 100 parts by mass of the two-component developer.

The developer of the present embodiment may be suitably used for image formation according to various electrophotographic methods known in the art, such as a magnetic one-component developing method, a non-magnetic one-component developing method, and a two-component developing method.

<Carrier>

The carrier is not particularly limited and may be appropriately selected depending on the intended purpose. The carrier is preferably a carrier including carrier particles, each of which includes a core, and a resin layer covering the core a coating layer).

<<Cores>>

A material of the cores is not particularly limited and may be appropriately selected depending on the intended purpose. Examples thereof include a manganese-strontium-based material of from 50 emu/g through 90 emu/g, and a manganese-magnesium-based material of from 50 emu/g through 90 emu/g. In order to ensure a desired image density, moreover, a high magnetic material, such as iron powder of 100 emu/g or greater and magnetite of from 75 emu/g through 120 emu/g is preferably used. Moreover, a low magnetic material, such as a copper/zinc-based material of from 30 emu/g through 80 emu/g is preferably used, because an impact of the developer in the form of a brush to the photoconductor can be weakened, and a high quality image can be formed. The above-listed examples may be used alone or in combination.

The volume average particle diameter of the cores is not particularly limited and may be appropriately selected depending on the intended purpose. The volume average particle diameter thereof is preferably from 10 μm through 150 μm, and more preferably from 40 μm through 100 μm.

The cores having the volume average particle diameter of 10 μm or greater are preferable because the following problem can be prevented. The problem is a problem that the amount of fine powder increases in the carrier to reduce magnetization per particle to cause carrier scattering can be prevented.

The cores having the volume average particle diameter of 150 μm or less is preferable because the following problem is effectively prevented. The problem is a problem that a specific surface area is reduced to cause toner scattering, and reproducibility of a full-color image having a large solid image area, especially reproducibility of the solid image area, may be impaired.

<<Resin Layer>>

The resin layer includes a resin, and may further include other components according to the necessity.

As a resin used in the resin layer, any of know materials that can impart necessary chargeability may be used. Specifically, a silicone resin, an acrylic resin, or a combination thereof is preferably used. Moreover, a composition for forming the resin layer preferably includes a silane coupling agent.

The average film thickness of the resin layer is preferably from 0.05 μm through 0.50 μm.

(Toner Storage Unit)

According to one aspect of the present disclosure, the toner storage unit is configured to store the toner of the present embodiment. The toner storage unit of the present aspect includes a unit configured to store a toner, and the toner stored in the unit. Examples of embodiments of the toner stored unit include a toner stored container, a developing device, and a process cartridge.

The toner stored container includes a container configured to store a toner, and the toner stored in the container.

The developing device is a device including a unit configured to store a toner and develop with the toner, and the toner stored in the unit.

The process cartridge includes at least an electrostatic latent image bearer (also referred to as an image bearer) and a developing unit as an integrated unit, and a toner. The process cartridge is detachably mounted in an image forming apparatus. The process cartridge may further include at least one selected from the group consisting of a charging unit, an exposing unit, and a cleaning unit.

The toner storage unit of the present aspect stores therein the toner of the present aspect. Since the toner storage unit of the present aspect is mounted in an image forming apparatus and image formation is performed by such image forming apparatus, image formation is performed using the toner of the present aspect. Therefore, the toner storage unit of the present aspect can form an excellent image with achieving excellent chargeability, low temperature fixability, hot offset resistance, and blocking resistance after fixing.

(Image Forming Apparatus)

According to one aspect of the present disclosure, the image forming apparatus includes an electrostatic latent image bearer, an electrostatic latent image forming unit configured to form an electrostatic latent image on the electrostatic latent image bearer, and a developing unit configured to develop the electrostatic latent image formed on the electrostatic latent image bearer with the toner to form a visible image. The image forming apparatus may further include other units according to the necessity.

In addition to the electrostatic latent image bearer, the electrostatic latent image forming unit, and the developing unit, the image forming apparatus of the present aspect more preferably further includes a transferring unit configured to transfer the visible image onto a recording medium, and a fixing unit configured to fix the transferred visible image on the surface of the recording medium.

The developing unit uses the toner of the present aspect. The developing unit preferably includes the toner of the present aspect, and uses a developer including the toner and optionally other components, such as a carrier, to form a toner image.

<Electrostatic Latent Image Bearer>

A structure, size, etc. of the electrostatic latent image bearer (also referred to as a "photoconductor" hereinafter) are not particularly limited and may be appropriately selected from those known in the art.

A material of the electrostatic latent image bearer is not particularly limited and may be appropriately selected from materials known in the art. Examples thereof include inorganic photoconductors (e.g., amorphous silicon and selenium) and organic photoconductors (OPC) (e.g., polysilane and phthalopolymethine). Among the above-listed examples, amorphous silicon is preferable considering long service life.

As the amorphous silicon photoconductor, a photoconductor including a light conductive layer formed of a-Si can be used. Such photoconductor can be produced, for example, by heating a support to a temperature of from 50° C. through 400° C., and depositing a-Si as a photoconductive layer on the support by a film formation method, such as vacuum vapor deposition, sputtering, ion plating, and thermal chemical vapor deposition (CVD), photo CVD, and plasma CVD. Among the above-listed example, a preferable method for forming the photoconductor is a method where a-Si deposition film is formed on a support by plasma CVD, i.e., decomposing raw material gas by direct current, high frequency waves, or microwave glow discharge to deposit a-Si on the support.

The shape of the electrostatic latent image bearer is not particularly limited and may be appropriately selected depending on the intended purpose. The shape thereof is preferably a cylinder. The outer diameter of the cylindrical electrostatic latent image bearer is not particularly limited and may be appropriately selected depending on the intended purpose. The outer diameter thereof is preferably from 3 mm through 100 mm, more preferably from 5 mm through 50 mm, and particularly preferably from 10 mm through 30 mm.

<Electrostatic Latent Image Forming Unit>

The electrostatic latent image forming unit is not particularly limited as long as the electrostatic latent image forming unit is a unit configured to form an electrostatic latent image on the electrostatic latent image bearer. The electrostatic latent image forming unit may be appropriately selected depending on the intended purpose.

For example, the electrostatic latent image forming unit includes a charging member (i.e., a charger) configured to uniformly charge a surface of the electrostatic latent image bearer, and an exposing member (i.e., an exposing unit) configured to expose the surface of the electrostatic latent image to light imagewise.

The charger is not particularly limited and may be appropriately selected depending on the intended purpose depending on the intended purpose. Examples thereof include a contact charger equipped with a conductive or semiconductive roller, brush, film, or rubber blade, and a non-contact charger utilizing corona discharge, such as corotron, and scorotron.

A shape of the charger may be any shape, such as a magnetic brush and fur brush, as well as a roller. The shape thereof may be selected depending on specifications or configuration of an image forming apparatus.

The charger is preferably a charger that is disposed in contact with or without contact with the electrostatic latent image bearer and is configured to apply superimposed DC and AC voltage to charge the surface of the electrostatic latent image bearer. Moreover, the charger is preferably a charger that is disposed close to the electrostatic latent image bearer via a gap tape without contacting with the electrostatic latent image bearer, and is configured to apply superimposed DC and AC voltage to the charging roller to charge the surface of the electrostatic latent image bearer.

The charger is not limited to a contact charger, but a contact charging member is preferably used because an image forming apparatus including such charger can reduce an amount of ozone generated from the charger.

The exposing unit is not particularly limited as long as the exposing unit is a unit configured to expose the surface of the electrostatic latent image bearer, which has been charged by the charger, to light imagewise corresponding to an image to be formed. The exposing unit may be appropriately selected depending on the intended purpose. Examples thereof include various exposing units, such as a copy optical exposing unit, a rod lens array exposing unit, a laser optical exposing unit, and a liquid crystal shutter optical exposing unit.

A light source used for the exposing unit is not particularly limited and may be appropriately selected depending on the intended purpose. Examples thereof include most of light emitters, such as a fluorescent lamp, a tungsten lamp, a halogen lamp, a mercury lamp, a sodium vapor lamp, a light emitting diode (LED), a semiconductor laser (LD), and an electroluminescent light (EL).

In order to apply only light having a desired wavelength range, moreover, various filters, such as a sharp-cut filter, a band-pass filter, a near infrared ray-cut filter, a dichroic filter, an interference filter, and a color temperature conversion filter, may be used with the light source used for the exposing unit.

A back-exposure system may be employed. The back-exposure system is a system where imagewise exposure is performed from the back side of the electrostatic latent image bearer.

<Developing Unit>

The developing unit is not particularly limited as long as the developing unit is a unit configured to develop the electrostatic latent image formed on the electrostatic latent image bearer to form a visible image. The developing unit may be appropriately selected depending on the intended purpose.

For example, the developing unit preferably includes a developing device that stores a toner, and is capable of applying the toner to the electrostatic latent image in the direct or indirect manner. The developing unit is more preferably a developing device including a toner stored container in which the toner is stored.

The developing device may be a developing device for a single color, or a developing device for multiple colors.

For example, the developing device is preferably a developing device including a stirrer configured to stir the toner to charge the toner with friction, and a developer bearer, inside of which a magnetic field generating unit is disposed and fixed, where the developer bearer is configured to bear a developer including the toner on a surface thereof, and is rotatable.

<Transferring Unit>

The transferring unit preferably has a configuration including a primary transferring unit configured to transfer visible images onto an intermediate transfer member to form a composite transfer image, and a secondary transferring unit configured to transfer the composite transfer image onto a recording medium.

The intermediate transfer member is not particularly limited and may be appropriately selected from known transfer members according to the intended purpose. For example, a transfer belt is preferably used as the intermediate transfer member.

The transferring unit (e.g., the primary transferring unit and the secondary transferring unit) preferably includes a transferor configured to charge the visible image formed on the electrostatic latent image bearer (i.e., the photoconductor) to release the visible image from the electrostatic latent image bearer to the side of a recording medium. The number of the transferor disposed may be one, or two or more.

Examples of the transferor include a corona transferor using corona discharge, a transfer belt, a transfer roller, a press transfer roller, and an adhesion transferor.

The recording medium is typically plane paper, and the recording medium is not particularly limited as long as the recording medium is a medium to which an unfixed image after developing can be transferred. The recording medium may be appropriately selected depending on the intended purpose. A PET base for OHP may be also used as the recording medium.

<Fixing Unit>

The fixing unit is not particularly limited and may be appropriately selected depending on the intended purpose. The fixing unit is preferably a known heat press unit.

Examples of the heat press unit include a combination of a heating roller and a press roller, and a combination of a heating roller, a press roller, and an endless belt.

The fixing unit is preferably a heat press unit including a heater equipped with a heating element, a film to be in contact with the heater, and a press member configured to press against the heater via the film, where the heat press unit is configured to pass a recording medium, on which an unfixed image is formed, between the film and the press member to heat and fix the image.

Heating by the heat unit is typically preferably performed at a temperature of from 80° C. through 200° C.

The surface pressure applied by the heat press unit is not particularly limited and may be appropriately selected depending on the intended purpose. The surface pressure is preferably from 10 $N/cm^2$ through 80 $N/cm^2$.

In the present disclosure, for example, a known optical fixing device may be used in combination with or instead of the fixing unit according to the intended purpose.

<Other Units>

The above-mentioned other units are not particularly limited and may be appropriately selected depending on the intended purpose. Examples thereof include a charge-eliminating unit, a recycling unit, and a controlling unit.

<<Charge-Eliminating Unit>>

The charge-eliminating unit is not particularly limited as long as the charge-eliminating unit is a unit configured to apply charge-eliminating bias to the electrostatic latent image bearer to eliminate the charge of the electrostatic latent image bearer. The charge-eliminating unit may be appropriately selected from known charge-eliminating members. Examples of the charge-eliminating unit include a charge-eliminating lamp.

<<Cleaning Unit>>

The cleaning unit is not particularly limited as long as the cleaning unit is capable of removing the toner remained on the electrostatic latent image bearer. The cleaning unit may be appropriately selected from known cleaners.

Examples of the cleaning unit include a magnetic brush cleaner, an electrostatic brush cleaner, a magnetic roller cleaner, a blade cleaner, a brush cleaner, and a web cleaner.

Since the image forming apparatus of the present aspect includes the cleaning unit, cleaning performance can be improved. Specifically, flowability of the toner is controlled by controlling attraction force between toner particles, and as a result, cleaning performance is improved. Moreover, excellent cleaning performance can be maintained even under severe conditions, such as a long service life, and high temperature and high humidity conditions, by controlling properties of the toner after deterioration. Furthermore, the external additives are sufficiently released from the toner base particles on the photoconductor, and therefore a deposition layer (i.e., a dam layer) of the external additives is formed at the nip with the cleaning blade to thereby achieve high cleaning performance.

<<Recycling Unit>>

The recycling unit is not particularly limited. Examples thereof include known conveyance units.

<<Controlling Unit>>

The controlling unit is configured to control the operation of each of the above-mentioned units.

The controlling unit is not particularly limited as long as the controlling unit can control the operation of each of the above-mentioned units. The controlling unit may be appropriately selected depending on the intended purpose. Examples thereof include controlling devices, such as a sequencer, and a computer.

Since the image forming apparatus of the present aspect forms an image using the toner of the present aspect, an excellent image can be provided with achieving excellent chargeability, low temperature fixability, hot offset resistance, and blocking resistance after fixing.

(Image Forming Method)

According to one aspect of the present disclosure, the image forming method includes an electrostatic latent image forming step, and a developing step, and may further include other steps according to the necessity. The electrostatic latent image forming step includes forming an electrostatic latent image on an electrostatic latent image bearer, and the developing step includes developing the electrostatic latent image with a toner to form a visible image.

The image forming method is suitably performed by the image forming apparatus. The electrostatic latent image forming step is suitably performed by the electrostatic latent image forming unit. The developing step is suitably performed by the developing unit. The above-mentioned other steps are suitably performed by the above-mentioned other units.

In addition to the electrostatic latent image forming step and the developing step, the image forming method of the present aspect more preferably further includes a transferring step, and a fixing step. The transferring step includes transferring the visible image onto a recording medium, and the fixing step includes fixing the transferred visible image on the recording medium.

<Electrostatic Latent Image Forming Step>

The electrostatic latent image forming step is a step including forming an electrostatic latent image on an electrostatic latent image bearer. The electrostatic latent image forming step includes a charging step and an exposing step.

The charging step includes charging the surface of the electrostatic latent image bearer, and the exposing step includes exposing the charged surface of the electrostatic latent image bearer to light to form an electrostatic latent image.

For example, the charging is performed by applying voltage to the surface of the electrostatic latent image using a charger.

For example, the exposing is performed by exposing the surface of the electrostatic latent image bearer to light imagewise using the exposing device.

For example, formation of an electrostatic latent image is performed by after uniformly charging a surface of an electrostatic latent image bearer, exposing the surface of the electrostatic latent image bearer to light imagewise. The formation of the electrostatic latent image can be performed by the electrostatic latent image forming unit.

<Developing Step>

The developing step is a step including sequentially developing the electrostatic latent image with toners of multiple colors to form visible images. For example, the formation of the visible image can be performed by developing the electrostatic latent image with the toner, and can be performed by the developing device.

In the developing step, the toner of the present aspect is used. The developing step preferably includes a developer including the toner of the present aspect and optionally other components, such as a carrier, to form a toner image.

Inside the developing device, for example, the toner and the carrier are mixed and stirred to charge the toner with friction, and the charged toner is held on the surface of the rotating magnetic roller in the form of a brush to thereby form a magnetic brush. Since the magnetic roller is disposed near the electrostatic latent image bearer (i.e., the photoconductor), part of the toner constituting the magnetic brush formed on the surface of the magnetic roller is moved to the surface of the electrostatic latent image bearer (i.e., the photoconductor) by electric suction force. As a result, the electrostatic latent image is developed with the toner to form a visible image on the surface of the electrostatic latent image bearer the photoconductor) with the toner.

<Transferring Step>

The transferring step is a step including transferring the visible image onto a recording medium.

A preferable embodiment of the transferring step uses an intermediate transfer member, and includes primary transferring the visible image onto an intermediate transfer member, followed by secondary transferring the visible image onto a recording medium.

A more preferable embodiment of the transferring step uses toners of two or more colors, preferably full-color toners, and includes a primary transferring step and a secondary transferring step. The primary transferring step includes transferring visible images onto an intermediate transfer member to form a composite transfer image, and the secondary transferring step includes transferring the composite transfer image onto a recording medium.

For example, the transferring can be performed by charging the electrostatic latent image bearer (i.e., the photoconductor) using a transfer charger. The transferring can be performed by the transferring unit.

<Fixing Step>

The fixing step is a step including fixing the visible image transferred on the recording medium using the fixing device. The fixing step may be performed every time the developer of each color is transferred onto the recording medium, or performed at once when developers of all colors are superimposed on the recording medium.

<Other Steps>

The image forming method of the present aspect may further include appropriately selected other steps according to the necessity.

The above-mentioned other steps are not particularly limited and may be appropriately selected depending on the intended purpose. Examples thereof include a charge-eliminating step, a cleaning step, and a recycling step.

<<Charge-Eliminating Step>>

The charge-eliminating step is a step including applying charge-eliminating bias to the electrostatic latent image bearer to eliminate the charge of the electrostatic latent image bearer. The charge-eliminating step is suitably performed by the charge-eliminating unit, <<Cleaning Step>>

The cleaning step is a step including removing the toner remained on the electrostatic latent image bearer. The cleaning step is suitably performed by the cleaning unit.

<<Recycling Step>>

The recycling step is a step including recycling the toner removed by the cleaning unit to the developing unit. The recycling step is suitably performed by the recycling unit.

Since the image forming method of the present aspect forms an image using the toner of the present aspect, an excellent image can be obtained with achieving excellent chargeability, low temperature fixability, hot offset resistance, and blocking resistance after fixing.

Embodiment of Image Forming Apparatus

Next, one embodiment of the image forming apparatus of the present aspect will be described with reference to FIG. 1. FIG. 1 is a schematic view illustrating one example of the image forming apparatus of the present aspect. As illustrated in FIG. 1, the image forming apparatus 1A includes a photoconductor drum 10 serving as the electrostatic latent image bearer, a charging roller 20 serving as the charging unit, an exposing device 30 serving as the exposing unit, a developing device 40 serving as the developing unit, an intermediate transfer member (i.e., an intermediate transfer belt) 50, a cleaning device 60 serving as the cleaning unit, a transfer roller 70 serving as the transferring unit, a charge-eliminating lamp 80 serving as the charge-eliminating unit, and an intermediate transfer member cleaning device 90.

The intermediate transfer member 50 is an endless belt supported by 3 rollers 51 disposed inside the loop of the intermediate transfer member 50, and can move in the direction indicated with the arrow in FIG. 1. Part of the 3 rollers 51 also functions as a transfer bias roller capable of applying the predetermined transfer bias primary transfer bias) to the intermediate transfer member 50. The intermediate transfer member cleaning device 90 is disposed near the intermediate transfer member 50. Moreover, the transfer roller 70 is disposed near the intermediate transfer member 50 to face the intermediate transfer member 50, and the transfer roller 70 is capable of applying transfer bias (i.e., secondary transfer bias) for transferring (i.e., secondary transferring) the developed image the toner image) onto transfer paper P serving as a recording medium. At the periphery of the intermediate transfer member 50, a corona charger 52 configured to apply charge to the toner image on the intermediate transfer member 50 is disposed between a contact area between the photoconductor drum 10 and the intermediate transfer member 50 and a contact area between the intermediate transfer member 50 and the transfer paper P along the rotational direction of the intermediate transfer member 50.

The developing device 40 include a developing belt 41 serving as the developer bearer, and a black (Bk) developing unit 42K, a yellow (Y) developing unit 42Y, a magenta (M) developing unit 42M, and a cyan (C) developing unit 42C disposed together at the periphery of the developing belt 41.

The developing belt 41 is an endless belt supported by a plurality of belt rollers, and can rotate in the direction indicated with the arrow in FIG. 1. Moreover, part of the developing belt 41 is in contact with the photoconductor drum 10.

The black developing unit 42K includes a developer storage unit 421K, a developer supply roller 422K, and a developing roller (i.e., a developer bearer) 423K.

The yellow developing unit 42Y includes a developer storage unit 421Y, a developer supply roller 422Y, and a developing roller 423Y.

The magenta developing unit 42M includes a developer storage unit 421M, a developer supply roller 422M, and a developing roller 423M.

The cyan developing unit 42C includes a developer storage unit 421C, a developer supply roller 422C, and a developing roller 423C.

Next, a method for forming an image using the image forming apparatus 1A will be described. First, a surface of the photoconductor drum 10 is uniformly charged by the charging roller 20. Then, the photoconductor drum 10 is exposed to exposure light L by means of the exposing device 30 to form an electrostatic latent image. Next, the electrostatic latent image formed on the photoconductor drum 10 is developed with a toner supplied from the developing device 40 to form a toner image. Moreover, the toner image formed on the photoconductor drum 10 is transferred (primary transferred) onto the intermediate transfer member 50 by the transfer bias applied from the roller 51. Thereafter, the toner image is transferred (secondary transferred) onto transfer paper P fed by a paper feeding unit (not illustrated) by transfer bias applied from the transfer roller 70. Meanwhile, the toner remained on the surface of the photoconductor drum 10, from which the toner image has been transferred to the intermediate transfer member 50, is removed by the cleaning device 60. Then, the charge of the photoconductor drum 10 is eliminated by the charge-eliminating lamp 80. The toner remained on the intermediate transfer member 50, from which the toner image has been transferred, is removed by the intermediate transfer member cleaning device 90.

After completing the transferring step, the transfer paper P is transported to the fixing unit, and the toner image transferred on the transfer paper P is fixed on the transfer paper P by the fixing unit.

Figure 2:
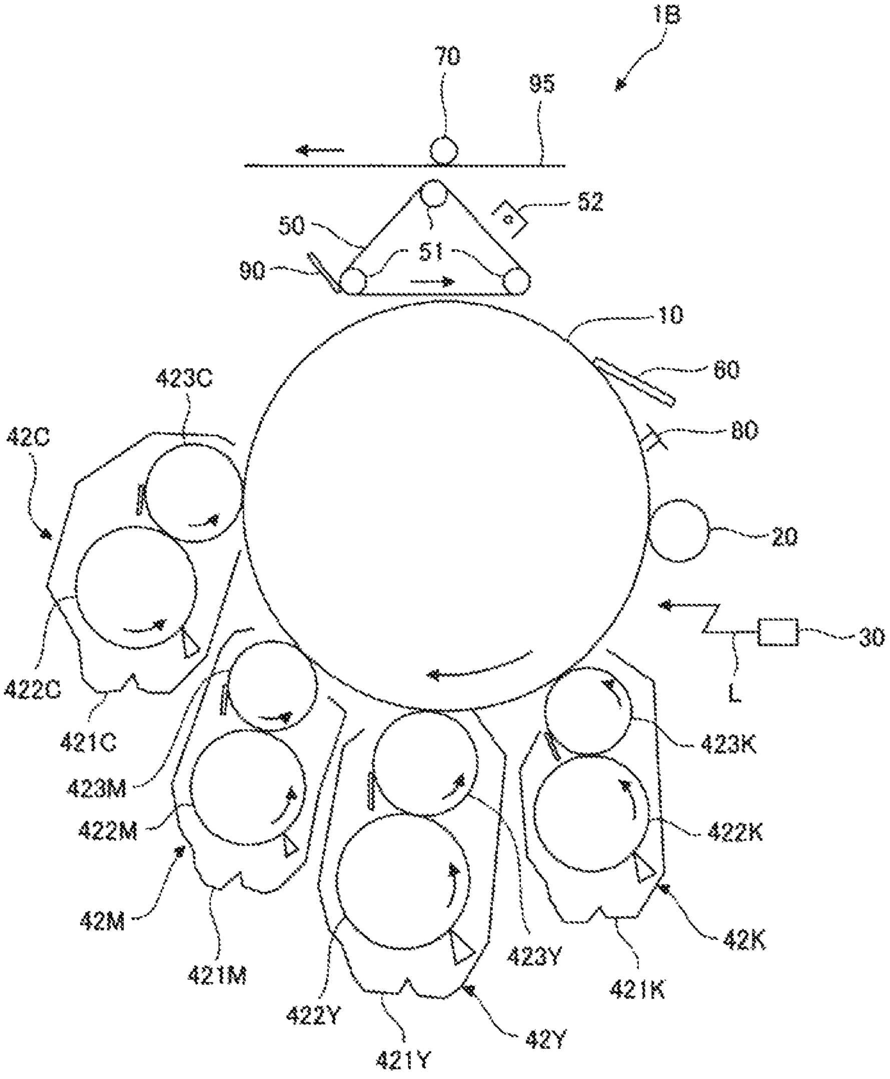
FIG. 2 is a schematic view illustrating another example of the image forming apparatus according to one aspect.

FIG. 2 is a schematic view illustrating another example of the image forming apparatus of the present aspect. As illustrated in FIG. 2, the image forming apparatus 1B has the identical structure to the structure of the image forming apparatus 1A of FIG. 1, except that a black developing unit 42K, a yellow developing unit 42Y, a magenta developing unit 42M, and a cyan developing unit 42C are disposed at the periphery of the photoconductor drum 10 to directly face the photoconductor drum 10 without disposing the developing belt 41.

Figure 3:
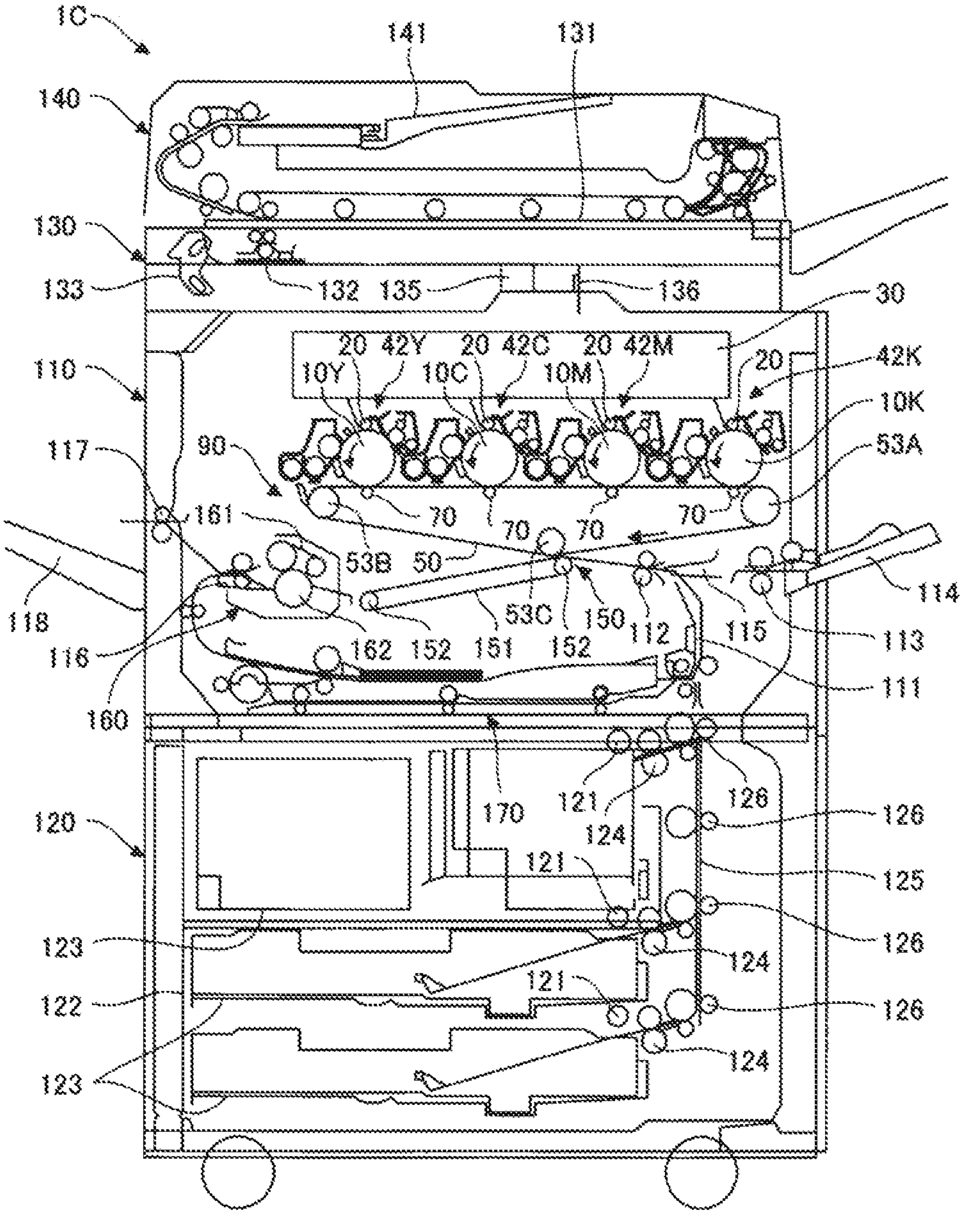
FIG. 3 is a schematic view illustrating an example of the image forming apparatus according to one aspect.

FIG. 3 is a schematic view illustrating yet another example of the image forming apparatus of the present aspect. As illustrated in FIG. 3, the image forming apparatus 1C is a tandem color image forming apparatus and includes a copier main body 110, a paper feeding table 120, a scanner 130, an automatic document feeder (ADF) 140, a secondary transferring device 150, a fixing device 160 serving as the fixing unit, and a sheet reverser 170.

At the center of the copier main body 110, the intermediate transfer member 50, which is an endless belt, is disposed. The intermediate transfer member 50 is the endless belt supported by 3 rollers 53A, 53B, and 53C, and can move in the direction indicated with the arrow in FIG. 3. The intermediate transfer member cleaning device 90 configured to remove the toner remained on the intermediate transfer member 50, from which the toner image has been transferred to recording paper, is disposed near the roller 53B. An image forming unit (i.e., a yellow (Y) developing unit 42Y, a cyan (C) developing unit 42C, a magenta (M) developing unit 42M, and a black (Bk) developing unit 42K) is aligned and disposed along the conveying direction to face a section of the intermediate transfer member 50 supported by the rollers 53A and 53B.

Moreover, the exposing device 30 is disposed near the image forming unit. Moreover, the secondary transferring device 150 is disposed at the side of the intermediate transfer member 50 opposite to the side thereof where the image forming unit is disposed. The secondary transferring device 150 includes a secondary transfer belt 151. The secondary transfer belt 151 is an endless belt supported by a pair of rollers 152. Recording paper conveyed on the secondary transfer belt 151 and the intermediate transfer member 50 can be brought into contact with each other at the section between the roller 53C and the roller 152.

Moreover, the fixing device 160 is disposed near the secondary transfer belt 151. The fixing device 160 includes a fixing belt 161, which is an endless belt supported by a pair of rollers, and a press roller 162 disposed to press against the fixing belt 161.

Near the secondary transfer belt 151 and the fixing device 160, furthermore, disposed is the sheet reverser 170 configured to flip the side of the recording paper, when image formation is performed on the both sides of the recording paper.

Next, a method for forming a full-color image using the image forming apparatus 1C will be explained. First, a color document is set on a document table 141 of the automatic document feeder (ADF) 140. Alternatively, the automatic document feeder 140 is opened, a color document is set on contact glass 131 of the scanner 130, and then automatic document feeder 140 is closed.

In the case where the color document is set on the automatic document feeder 140, once a start switch (not illustrated) is pressed, the color document is transported onto the contact glass 131, and then the scanner 130 is driven to scan the color document with a first carriage 132 equipped with a light source and a second carriage 133. In the case where the document is set on the contact glass 131, the scanner 130 is immediately driven to scan the document with the first carriage 132 equipped with the light source and the second carriage 133. During the scanning operation, light emitted from the first carriage 132 is reflected by the surface of the document, the reflected light from the surface of the document is reflected by a mirror of the second carriage 133, and then the reflected light is received by a reading sensor 136 via an image formation lens 135 to read the color document (i.e., the color image), to thereby image information of black, yellow, magenta, and cyan.

The image formation of each color is transmitted to the developing unit of each color (e.g., a yellow developing unit 42Y, a cyan developing unit 42C, a magenta developing unit 42M, and a black developing unit 42K) to form a toner image of each color.

Figure 4:
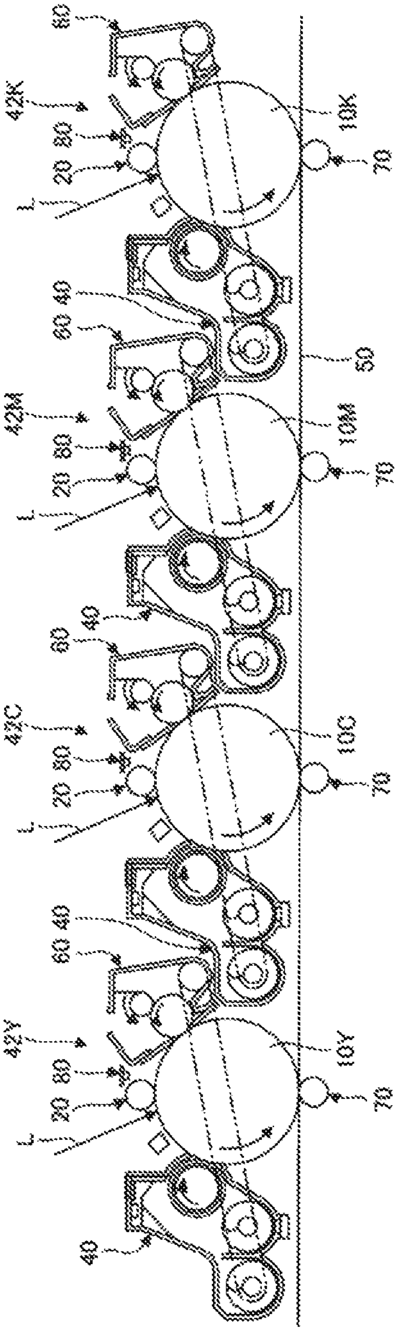
FIG. 4 is an enlarged partial view of the image forming apparatus of FIG. 3.

FIG. 4 is an enlarged partial view of the image forming apparatus of FIG. 3. As illustrated in FIG. 4, each developing unit (e.g., a yellow developing unit 42Y, a cyan developing unit 42C, a magenta developing unit 42M, and a black developing unit 42K) includes each photoconductor drum 10 (a photoconductor drum for black 10K, a photoconductor drum for yellow 10Y, a photoconductor drum for magenta 10M, and a photoconductor drum for cyan 10C), a charging roller 20, which is a charging unit configured to uniformly charge the photoconductor drum 10, an exposing device 30 (not illustrated) configured to expose the photoconductor drum 10 to exposure L based on the image information of each color to form an electrostatic latent image for each color on the photoconductor drum 10, a developing device 40, which is a developing unit configured to develop the electrostatic latent image with a developer of each color to form a toner image of each color, a transfer charger 62 (not, illustrated) configured to transfer the toner image onto an intermediate transfer member 50, a cleaning device 60, and a charge-eliminating lamp 80.

In FIG. 3, toner images of different colors formed on the developing units of respective colors (i.e., the yellow developing unit 42Y, the cyan developing unit 42C, the magenta developing unit 42M, and the black developing unit 42K) are sequentially transferred (primary transferred) onto an intermediate transfer member 50 supported and driven by the rollers 53A, 53B, and 53C. Then, the toner images of different colors are superimposed on the intermediate transfer member 50 to form a composite toner image.

In the paper feeding table 120, meanwhile, one of the paper feeding rollers 121 is selectively rotated to eject recording paper from one of multiple paper feeding cassettes 123 of the paper bank 122.

Pieces of the ejected recording paper are separated one by one by a separation roller 124 to send each recording paper to a paper feeding path 125, and then transported by a conveying roller 126 into a paper feeding path 111 within the copier main body 110. The recording paper transported in the paper feeding path 111 is then bumped against a registration roller 112 to stop. Alternatively, pieces of the recording paper on a manual-feeding tray 114 are ejected by rotating a manual paper feeding roller 113, separated one by one by the manual paper feeding roller 113 to guide into a manual paper feeding path 115, and then bumped against the registration roller 112 to stop.

The registration roller 112 is generally earthed at the time of use, but the registration roller 112 may be biased for removing paper dusts of the recording paper.

Next, the registration roller 112 is rotated synchronously with the movement of the composite toner image on the intermediate transfer member 50, to thereby send the recording paper between the intermediate transfer member 50 and the secondary transfer belt 151. The composite toner image is then transferred (secondary transferred) to the recording paper. Note that, the toner remained on the intermediate transfer member 50, from which the composite toner image has been transferred, is removed by the intermediate transfer member cleaning device 90.

The recording paper to which the composite toner image has been transferred is transported on the secondary transfer belt 151 and then the composite toner image is fixed thereon by the fixing device 160.

Thereafter, the traveling path of the recording paper is switched by a separation craw 116 and the recording paper is ejected to a paper ejection tray 118 by an ejecting roller 117. Alternatively, the traveling path of the recording paper is switched by the separation craw 116, the recording paper is reversed by the sheet reverser 170 and is again guided to the secondary transfer belt 151, an image is formed on a back side of the recording paper in the same manner, and then the recording paper is ejected to the paper ejection tray 118 by the ejecting roller 117.

<Process Cartridge>

According to one aspect, the process cartridge is detachably mountable in various image forming apparatuses, and includes an electrostatic latent image bearer configured to bear an electrostatic latent image thereon, and a developing unit configured to develop the electrostatic latent image on the electrostatic latent image bearer with the developer of the above-described present aspect to form a toner image. The process cartridge may further include other components according to the necessity.

Since the electrostatic latent image bearer is identical to the electrostatic latent image bearer of the above-described image forming apparatus, detailed description thereof is omitted.

The developing unit includes a developer stored container configured to store the developer of the present aspect, and a developer bearer configured to bear the developer stored within the developer stored container and transport the developer. The developing unit may further include a regulating member in order to regulate a thickness of the developer to be borne.

Figure 5:
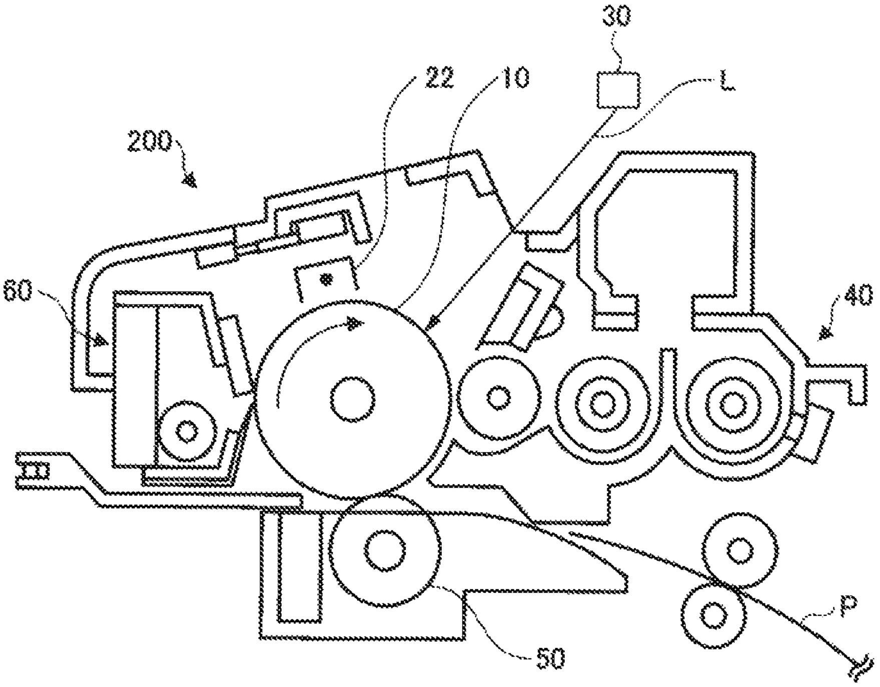
FIG. 5 is a schematic view illustrating an example of the process cartridge according to one aspect.

An example of the process cartridge of the present aspect is illustrated in FIG. 5. As illustrated in FIG. 5, the image forming apparatus process cartridge 200 includes a photoconductor drum 10, a corona charger 22 serving as the charging unit, a developing device 40, a cleaning device 60, and a transfer roller 70 (not illustrated).

EXAMPLES

The present disclosure will be described below by way of Examples and Comparative Examples. The present disclosure should not be construed as being limited to these Examples and Comparative Examples.

Production Example A-1

Synthesis of Prepolymer A-1

A reaction vessel equipped with a heater, a cooling tube, a stirrer, and a nitrogen-inlet tube was charged with 3-methyl-1,5-pentanediol, isophthalic acid, and adipic acid together with titanium tetraisopropoxide (1,000 ppm relative to the resin component). At this time a molar ratio OH/COOH of the hydroxyl groups to the carboxyl groups was set to 1.1, the diol component included 110 mol % of 3-methyl-1,5-pentanediol, and the dicarboxylic acid component included 40 mol % of isophthalic acid and 60 mol % of adipic acid. Subsequently, the resultant mixture was heated to 200° C. for about 4 hours, then heated to 230° C. for 2 hours, and the mixture was allowed to react until no more water was discharged. Thereafter, the resultant was reacted for 5 hours under the reduced pressure of from 10 mmHg through 15 mmHg, to thereby obtain intermediate Polyester A-1.

Subsequently, a reaction tank equipped with a heater, a cooling tube, a stirrer, and a nitrogen-inlet tube was charged with Intermediate Polyester A-1, and a hexamethylene isocyanate derivative (HDI isocyanurate) in the manner that a molar ratio (NCO/OH) of isocyanurate groups of the HDI isocyanurate to hydroxyl groups of Intermediate Polyester A-1 was to be 2.0. To the resultant mixture, ethyl acetate was added and dissolved the mixture to form a 50% ethyl acetate solution. Thereafter, the resultant was heated to 80° C. and allowed to react for 5 hours under a nitrogen flow, to thereby obtain an ethyl acetate solution of a prepolymer including a hydroxyl group at a terminal (OH group terminal-containing prepolymer A-1). Thereafter, the pressure was reduced until the residual amount of the ethyl acetate in the ethyl acetate solution of OH group terminal-containing prepolymer A-1 was to be 100 ppm or less.

Next, a reaction vessel equipped with a heater, a cooling tube, a stirrer, and a nitrogen-inlet tube was charged with OH group terminal-containing prepolymer A-1 and monomethyl succinate in the manner that the molar ratio ($CH_3$/OH) of methyl groups of the monomethyl succinate and hydroxyl groups of OH group terminal-containing prepolymer A-1 was to be 2.0. The resultant mixture was allowed to react for 6 hours at 150° C., to thereby obtain a prepolymer having carboxylic acid terminals (Prepolymer A-1), which was a nonlinear polymer.

Production Example A-2

Synthesis of Prepolymer A-2

A reaction vessel equipped with a heater, a cooling tube, a stirrer, and a nitrogen-inlet tube was charged with 3-methyl-1,5-pentanediol, isophthalic acid, adipic acid, and trimellitic anhydride together with titanium tetraisopropoxide (1,000 ppm relative to the resin component). At this time a molar ratio OH/COOH of the hydroxyl groups to the carboxyl groups was set to 1.1, the diol component included 110 mol % of 3-methyl-1,5-pentanediol, the dicarboxylic acid component included 40 mol % of isophthalic acid and 60 mol % of adipic acid, and the amount of trimellitic anhydride in the entire monomers was set to 1 mol %. Subsequently, the resultant mixture was heated to 200° C. for about 4 hours, then heated to 230° C. for 2 hours, and the mixture was allowed to react until no more water was discharged. Thereafter, the resultant was reacted for 5 hours under the reduced pressure of from 10 mmHg through 15 mmHg, to thereby Intermediate Polyester A-2.

Subsequently, a reaction tank equipped with a heater, a cooling tube, a stirrer, and a nitrogen-inlet tube was charged with Intermediate Polyester A-2, and a hexamethylene isocyanate derivative (HDI isocyanurate) in the manner that a molar ratio (NCO/OH) of isocyanurate groups of the HDI isocyanurate to hydroxyl groups of Intermediate Polyester A-2 was to be 2.0. To the resultant mixture, ethyl acetate was added and dissolved the mixture to form a 50% ethyl acetate solution. Thereafter, the resultant as heated to 80° C. and allowed to react for 5 hours under a nitrogen flow, to thereby obtain an ethyl acetate solution of a prepolymer including a hydroxyl group at a terminal (OH group terminal-containing prepolymer A-2). Thereafter, the pressure was reduced until the residual amount of the ethyl acetate in the ethyl acetate solution of OH group terminal-containing prepolymer A-2 was to be 100 ppm or less.

Next, a reaction vessel equipped with a heater, a cooling tube, a stirrer, and a nitrogen-inlet tube was charged with OH group terminal-containing prepolymer A-2 and monomethyl succinate in the manner that the molar ratio ($CH_3$/OH) of methyl groups of the monomethyl succinate and hydroxyl groups of OH group terminal-containing prepolymer A-2 was to be 2.0. The resultant mixture was allowed to react for 6 hours at 150° C., to thereby obtain a prepolymer having carboxylic acid terminals (Prepolymer A-2), which was a nonlinear polymer.

Production Example A-3

Synthesis of Prepolymer A-3

A reaction vessel equipped with a heater, a cooling tube, a stirrer, and a nitrogen-inlet tube was charged with 3-methyl-1,5-pentanediol, and adipic acid together with titanium tetraisopropoxide (1,000 ppm relative to the resin component). At this time, a molar ratio OH/COOH of the hydroxyl groups to the carboxyl groups was set to 1.1, the diol component included 110 mol % of 3-methyl-1,5-pentanediol, and the dicarboxylic acid component included 100 mol % of adipic acid. Subsequently, the resultant mixture was heated to 200° C. for about 4 hours, then heated to 230° C. for 2 hours, and the mixture was allowed to react until no more water was discharged. Thereafter, the resultant was reacted for 5 hours under the reduced pressure of from 10 mmHg through 15 mmHg, to thereby obtain Intermediate Polyester A-3.

Subsequently, a reaction tank equipped with a heater, a cooling tube, a stirrer, and a nitrogen-inlet tube was charged with Intermediate Polyester A-3, and a hexamethylene isocyanate derivative (HDI isocyanurate) in the manner that a molar ratio (NCO/OH) of isocyanurate groups of the HDI isocyanurate to hydroxyl groups of Intermediate Polyester A-3 was to be 2.0. To the resultant mixture, ethyl acetate was added and dissolved the mixture to form a 50% ethyl acetate solution. Thereafter, the resultant was heated to 80° C. and allowed to react for 5 hours under a nitrogen flow, to thereby obtain an ethyl acetate solution of a prepolymer including a hydroxyl group at a terminal (OH group terminal-containing prepolymer A-3). Thereafter, the pressure was reduced until the residual amount of the ethyl acetate in the ethyl acetate solution of OH group terminal-containing prepolymer A-3 was to be 100 ppm or less.

Next, a reaction vessel equipped with a heater, a cooling tube, a stirrer, and a nitrogen-inlet tube was charged with OH group terminal-containing prepolymer A-3 and monomethyl succinate in the manner that the molar ratio ($CH_3$/OH) of methyl groups of the monomethyl succinate and hydroxyl groups of OH group terminal-containing prepolymer A-3 was to be 2.0. The resultant mixture was allowed to react for 6 hours at 150° C., to thereby obtain a prepolymer having carboxylic acid terminals (Prepolymer A-3), which was a nonlinear polymer.

Production Example A-4

Synthesis of Prepolymer A-4

A reaction vessel equipped with a heater, a cooling tube, a stirrer, and a nitrogen-inlet tube was charged with 3-methyl-1,5-pentanediol, and isophthalic acid together with titanium tetraisopropoxide (1,000 ppm relative to the resin component). At this time a molar ratio OH/COOH of the hydroxyl groups to the carboxyl groups was set to 1.1, the diol component included 110 mol % of 3-methyl-1,5-pentanediol, the dicarboxylic acid component included 100 mol % of isophthalic acid. Subsequently, the resultant mixture was heated to 200° C. for about 4 hours, then heated to 230'C for 2 hours, and the mixture was allowed to react until no more water was discharged. Thereafter, the resultant was reacted for 5 hours under the reduced pressure of from 10 mmHg through 15 mmHg, to thereby obtain Intermediate Polyester A-4.

Subsequently, a reaction tank equipped with a heater, a cooling tube, a stirrer, and a nitrogen-inlet tube was charged with Intermediate Polyester A-4, and a hexamethylene isocyanate derivative (HDI isocyanurate) in the manner that a molar ratio (NCO/OH) of isocyanurate groups of the HDI isocyanurate to hydroxyl groups of Intermediate Polyester A-4 was to be 2.0. To the resultant mixture, ethyl acetate was added and dissolved the mixture to form a 50% ethyl acetate solution. Thereafter, the resultant as heated to 80° C. and allowed to react for 5 hours under a nitrogen flow, to thereby obtain an ethyl acetate solution of a prepolymer including a hydroxyl group at a terminal (OH group terminal-containing prepolymer A-4). Thereafter, the pressure was reduced until the residual amount of the ethyl acetate in the ethyl acetate solution of OH group terminal-containing prepolymer A-4 was to be 100 ppm or less.

Next, a reaction vessel equipped with a heater, a cooling tube, a stirrer, and a nitrogen-inlet tube was charged with OH group terminal-containing prepolymer A-4 and monomethyl succinate in the manner that the molar ratio ($CH_3$/OH) of methyl groups of the monomethyl succinate and hydroxyl groups of OH group terminal-containing prepolymer A-4 was to be 2.0. The resultant mixture was allowed to react for 6 hours at 150° C., to thereby obtain a prepolymer having carboxylic acid terminals (Prepolymer A-4), which was a nonlinear polymer.

Production Example a-1

Synthesis of Prepolymer a-1

A reaction vessel equipped with a heater, a cooling tube, a stirrer, and a nitrogen-inlet tube was charged with 3-methyl-1,5-pentanediol, isophthalic acid, adipic acid, and trimellitic anhydride together with titanium tetraisopropoxide (1,000 ppm relative to the resin component). At this time a molar ratio OH/COOH of the hydroxyl groups to the carboxyl groups was set to 1.1, the diol component included 110 mol % of 3-methyl-1,5-pentanediol, the dicarboxylic acid component included 40 mol % of isophthalic acid and 60 mol % of adipic acid, and the amount of the trimellitic anhydride in the entire monomers was set to be 1 mol %. Subsequently, the resultant mixture was heated to 200° C. for about 4 hours, then heated to 230° C. for 2 hours, and the mixture was allowed to react until no more water was discharged. Thereafter, the resultant was reacted for 5 hours under the reduced pressure of from 10 mmHg through 15 mmHg, to thereby obtain Intermediate Polyester a-1.

Subsequently, a reaction tank equipped with a heater, a cooling tube, a stirrer, and a nitrogen-inlet tube was charged with Intermediate Polyester a-1 and isophorone diisocyanate (IPDI) in the manner that a molar ratio (NCO/OH)) of isocyanate groups of IPDA to hydroxyl groups of Intermediate Polyester a-1 was to be 2.0. The resultant mixture was diluted with ethyl acetate to form a 50% ethyl acetate solution. Thereafter, the resultant was allowed to react for 5 hours at 100° C., to thereby obtain Prepolymer a-1.

Production Example a-2

Synthesis of Prepolymer a-2

A reaction vessel equipped with a heater, a cooling tube, a stirrer, and a nitrogen-inlet tube was charged with 3-methyl-1,5-pentanediol, isophthalic acid, and adipic acid together with titanium tetraisopropoxide (1,000 ppm relative to the resin component). At this time, a molar ratio OH/COOH of the carboxyl groups to the hydroxyl groups was set to 1.1, the diol component included 100 mol % of 3-methyl-1,5-pentanediol, and the dicarboxylic acid component included 50 mol % of isophthalic acid and 60 mol % of adipic acid. Subsequently, the resultant mixture was heated to 200° C. for about 4 hours, then heated to 230'C for 2 hours, and the mixture was allowed to react until no more water was discharged. Thereafter, the resultant was allowed to react for 5 hours under the reduced pressure of from 10 mmHg through 15 mmHg, to thereby obtain a linear prepolymer (Prepolymer a-2).

Production Example a-3

Synthesis of Prepolymer a-3

A reaction vessel equipped with a heater, a cooling tube, a stirrer, and a nitrogen-inlet tube was charged with 3-methyl-1,5-pentanediol, a bisphenol A ethylene oxide (2 mol) adduct, and isophthalic acid together with titanium tetraisopropoxide (1,000 ppm relative to the resin component). At this time, a molar ratio OH/COOH of the hydroxyl groups to the carboxyl groups was set to 1.1, the diol component included 80 mol % of 3-methyl-1,5-pentanediol and 30 mol % of bisphenol A ethylene oxide (2 mol) adduct, and the dicarboxylic acid component included 100 mol % of isophthalic acid. Subsequently, the resultant mixture was heated to 200° C. for about 4 hours, then heated to 230° C. for 2 hours, and the mixture was allowed to react until no more water was discharged. Thereafter, the resultant was reacted for 5 hours under the reduced pressure of from 10 mmHg through 15 mmHg, to thereby obtain Intermediate Polyester a-3.

Subsequently, a reaction tank equipped with a heater, a cooling tube, a stirrer, and a nitrogen-inlet tube was charged with Intermediate Polyester a-3, and a hexamethylene isocyanate derivative (HDI isocyanurate) in the manner that a molar ratio (NCO/OH) of isocyanurate groups of the HDI isocyanurate to hydroxyl groups of Intermediate Polyester a-3 was to be 2.0. To the resultant mixture, ethyl acetate was added and dissolved the mixture to form a 50% ethyl acetate solution. Thereafter, the resultant was heated to 80° C. and allowed to react for 5 hours under a nitrogen flow, to thereby obtain an ethyl acetate solution of a prepolymer including a hydroxyl group at a terminal (OH group terminal-containing prepolymer a-3). Thereafter, the pressure was reduced until the residual amount of the ethyl acetate in the ethyl acetate solution of group terminal-containing prepolymer a-3 was to be 100 ppm or less.

Next, a reaction vessel equipped with a heater, a cooling tube, a stirrer, and a nitrogen-inlet tube was charged with OH group terminal-containing prepolymer a-3 and monomethyl succinate in the manner that the molar ratio ($CH_3$/OH) of methyl groups of the monomethyl succinate and hydroxyl groups of OH group terminal-containing prepolymer a-3 was to be 2.0. The resultant mixture was allowed to react for 6 hours at 150° C., to thereby obtain a prepolymer having carboxylic acid terminals (Prepolymer a-8), which was a nonlinear polymer.

Production Example a-4

Synthesis of Prepolymer a-4

A reaction vessel equipped with a heater, a cooling tube, a stirrer, and a nitrogen-inlet tube was charged with 3-methyl-1,5-pentanediol, and 1,10-dodecanedioic acid together with titanium tetraisopropoxide (1,000 ppm relative to the resin component). At this time a molar ratio OH/COOH of the hydroxyl groups to the carboxyl groups was set to 1.1, the diol component included 110 mol % of 3-methyl-1,5-pentanediol, and the dicarboxylic acid component included 100 mol % of 1,10-dodecanedioic acid. Subsequently, the resultant mixture was heated to 200° C. for about 4 hours, then heated to 230° C. for 2 hours, and the mixture was allowed to react until no more water was discharged. Thereafter, the resultant was reacted for 5 hours under the reduced pressure of from 10 mmHg through 15 mmHg, to thereby obtain Intermediate Polyester a-4.

Subsequently, a reaction tank equipped with a heater, a cooling tube, a stirrer, and a nitrogen-inlet tube was charged with Intermediate Polyester a-4, and a hexamethylene isocyanate derivative (HDI isocyanurate) in the manner that a molar ratio (NCO/OH) of isocyanurate groups of the HDI isocyanurate to hydroxyl groups of Intermediate Polyester a-4 was to be 2.0. To the resultant mixture, ethyl acetate was added and dissolved the mixture to form a 50% ethyl acetate solution. Thereafter, the resultant was heated to 80° C. and allowed to react for 5 hours under a nitrogen flow, to thereby obtain an ethyl acetate solution of a prepolymer including a hydroxyl group at a terminal (OH group terminal-containing prepolymer a-4). Thereafter, the pressure was reduced until the residual amount of the ethyl acetate in the ethyl acetate solution of OH group terminal-containing prepolymer a-4 was to be 100 ppm or less.

Next, a reaction vessel equipped with a heater, a cooling tube, a stirrer, and a nitrogen-inlet tube was charged with OH group terminal-containing prepolymer a-4 and monomethyl succinate in the manner that the molar ratio ($CH_3$/OH) of methyl groups of the monomethyl succinate and hydroxyl groups of OH group terminal-containing prepolymer a-4 was to be 2.0. The resultant mixture was allowed to react for 6 hours at 150° C., to thereby obtain a prepolymer having carboxylic acid terminals (Prepolymer a-4), which was a nonlinear polymer.

Production Example B

Synthesis of Amorphous Polyester Resin B

A four-necked flask equipped with a nitrogen-inlet tube, a dehydration tube, a stirrer, and a thermocouple was charged with a bisphenol A ethylene oxide (2 mol) adduct, a bisphenol A propylene oxide (3 mol) adduct, isophthalic acid, and adipic acid in the manner that a molar ratio (bisphenol A ethylene oxide (2 mol) adduct/bisphenol A propylene oxide (3 mol) adduct) of the bisphenol A ethylene oxide (2 mol) adduct to the bisphenol A propylene oxide (3 mol) adduct was to be 85/15, a molar ratio (isophthalic acid/adipic acid) of isophthalic acid to adipic acid was to be 80/20, and a molar ratio OH/COOH of hydroxyl groups to carboxyl groups was to be 1.3. The resultant mixture together with titanium tetraisopropoxide (500 ppm relative to the resin component) was allowed to react for 8 hours at 230° C. under the ambient pressure, followed by reacting for 4 hours under the reduced pressure of from 10 mmHg through 15 mmHg. Thereafter, trimellitic anhydride was added to the reaction vessel in the mariner that the amount of trimellitic anhydride was to be 1 mol % relative to the entire resin component. Thereafter, the resultant was allowed to react for 3 hours at 180° C. under ambient pressure, to thereby obtain Amorphous Polyester Resin B.

Production Example C-1

Synthesis of Crystalline Polyester Resin C-1

A 5 L four-necked flask equipped with a nitrogen-inlet tube, a dehydration tube, a stirrer, and a thermocouple was charged with dodecanedioic acid and 1,6-hexanediol in the manner that a molar ratio OH/COOH of hydroxyl groups to carboxyl groups was to be 0.9. Thereafter, the resultant mixture together with titanium tetraisopropoxide (500 ppm relative to the resin component) was allowed to react for 10 hours at 180° C., and then the temperature was increased to 200° C. and reacted for 3 hours, followed by reacting for 2 hours under the pressure of 8.3 kPa, to thereby obtain Crystalline Polyester Resin C-1.

Production Example C-2

Synthesis of Crystalline Polyester Resin C-2

A 5 L four-necked flask equipped with a nitrogen-inlet tube, a dehydration tube, a stirrer, and a thermocouple was charged with 1,6-hexanediol and sebacic acid in the manner that a molar ratio OH/COOH of hydroxyl groups to carboxyl groups was to be 1.1. The resultant mixture together with titanium tetraisopropoxide (500 ppm relative to the resin component) was allowed to react with discharging water, followed by heating to 235° C. and reacting for 1 hour. Thereafter, the resultant was allowed to react for 6 hours under the reduced pressure of 10 mmHg or less. Then, the temperature was set to 185° C., and trimellitic anhydride was added in the manner that a molar ratio to COOH groups was to be 0.053. The resultant was allowed to react for 2 hours with stirring, to thereby obtain Crystalline Polyester Resin C-2.

<Production of Toner>

Example 1

A toner was produced by a dissolution suspension method in Example 1.

(Synthesis of Master Batch (MB))

Water (1,200 parts), 500 parts of carbon black (product name: PRINTEX35, available from Degussa, DBP oil absorption: 42 mL/100 mg, pH: 9.5), and 500 parts of Amorphous Polyester Resin B were added together and the resultant mixture was mixed by means of HENSCHEL MIXER (available from NIPPON COLE & ENGINEERING CO., LTD.). After kneading the mixture for 30 minutes at 150° C. using a twin-roll kneader, the resultant kneaded product was rolled and cooled, followed by pulverizing the resultant by a pulverizer to thereby obtain Master Batch 1.

(Preparation of Wax Dispersion Liquid)

A vessel was equipped with a stirrer and a thermometer was charged with 50 parts by mass of paraffin wax (HNP-9, available from NIPPON SEIRO CO., LTD., hydrocarbon-based wax, melting point: 75° C., SP value: 8.8) serving as Release Agent 1, and 450 parts by mass of ethyl acetate. The resultant mixture was heated to 80° C. with stirring, and the temperature was maintained at 80° C. for 5 hours. Thereafter, the mixture was cooled to 30° C. for 1 hour, and the resultant was dispersed by means of a bead mill (ULTRA VISCOMILL, available from AIMEX CO., Ltd.) under the conditions that the feeding rate was 1 kg/hour, the disk rim speed was 6 m/sec, zirconia beads each having a diameter of 0.5 mm were packed in the amount of 80% by volume, and the number of passes was 3, to thereby obtain Wax Dispersion Liquid 1.

(Preparation of Crystalline Polyester Resin Dispersion Liquid)

A vessel equipped with a stirring rod and a thermometer was charged with 50 parts by mass of Crystalline Polyester Resin C-1, 450 parts by mass of ethyl acetate. The resultant mixture was heated to 80° C. with stirring, and the temperature was maintained at 80° C. for 5 hours. Thereafter, the mixture was cooled to 30° C. for 1 hour, and the resultant was dispersed by means of a bead mill (ULTRA VISCOMILL, available from AIMEX CO., Ltd.) under the conditions that the feeding rate was 1 kg/hour, the disk rim speed was 6 m/sec, zirconia beads each having a diameter of 0.5 mm were packed in the amount of 80% by volume, and the number of passes was 3, to thereby obtain Crystalline Polyester Resin Dispersion Liquid 1.

(Preparation of Oil Phase)

A vessel was charged with 500 parts by mass of Wax Dispersion Liquid 1, 300 parts by mass of Prepolymer A-1, 500 parts by mass of Crystalline Polyester Resin Dispersion Liquid 1, 650 parts by mass of Amorphous Polyester Resin B, and 100 parts by mass of Master Batch 1, and the resultant mixture was stirred by TK Homomixer (available from PRIMIX Corporation) at 5,000 rpm for 60 minutes, to thereby obtain Oil Phase 1.

(Synthesis of Organic Particle Emulsion (Particle Dispersion Liquid))

A reaction vessel equipped with a stirring rod and a thermometer was charged with 683 parts by mass of water, 11 parts by mass of sodium salt of sulfuric acid ester of methacrylic acid-ethylene oxide adduct (ELEMINOL RS-30, available from SANYO CHEMICAL INDUSTRIES, LTD.), 138 parts by mass of styrene, 138 parts by mass of methacrylic acid, and 1 part by mass of ammonium persulfate. The resultant mixture was stirred for 15 minutes at 400 rpm to obtain a white emulsion. The emulsion was heated by increasing the temperature of the internal system to 75° C. and was allowed to react for 5 hours. To the resultant, 30 parts by mass of a 1% ammonium persulfate aqueous solution was added, and the resultant was matured for 5 hours at 75° C., to thereby obtain an aqueous dispersion liquid of a vinyl-based resin (copolymer of styrene-methacrylic acid-sodium salt of sulfuric acid ester of methacrylic acid-ethylene oxide adduct) (Particle Dispersion Liquid 1). The volume average particle diameter of the particles included in Particle Dispersion Liquid 1 obtained was measured by means of LA-920 (available from HORIBA, LTD.). The volume average particle diameter thereof was 0.14 μm.

(Preparation of Aqueous Phase)

Water (690 parts by mass), 83 parts by mass of Particle Dispersion Liquid 1, 37 parts by mass of a 48.5% by mass sodium dodecyldiphenyl ether disulfonate aqueous solution (ELEMINOL MON-7, available from SANYO CHEMICAL INDUSTRIES. LTD.), 90 parts by mass of ethyl acetate, 150 parts by mass of a 5% magnesium chloride solution, and 150 parts by mass of a 5% calcium chloride solution were mixed and stirred, to thereby obtain a milky white liquid, which was provided as Aqueous Phase 1. In this example, the magnesium chloride solution and the 5% calcium chloride solution were used as aqueous solutions of metal salts. Magnesium ions ($Mg^{2+}$) included in the magnesium chloride solution and calcium ions ($Ca^{2+}$) included in the 5% calcium chloride solution functioned as a crosslinking agent.

(Emulsification and Removal of Solvent)

Into a vessel charged with 800 parts by mass of Oil Phase 1, 1,200 parts by mass of Aqueous Phase 1 was added. The resultant mixture was mixed by means of TK Homomixer for 20 minutes at the rotational speed of 13,000 rpm, to thereby obtain Emulsified Slurry 1. A vessel equipped with a stirrer and a thermometer was charged with Emulsified Slurry 1 obtained, and the solvent was removed for 8 hours at 30° C. Thereafter, the resultant was matured for 4 hours at 45° C., to thereby obtain Dispersion Slurry 1. In this example, in Dispersion Slurry 1, magnesium ions and calcium ions induced metal ion crosslinking at terminals of Prepolymer A-1 to thereby generate a nonlinear polymer is that was a crosslinked component.

(Washing and Drying)

After filtering 1,100 parts by mass of the dispersion slurry under the reduced pressure, the series of the following processes (1) to (4) was performed twice, to thereby obtain Filtration Cake 1.

(1): To the filtration cake, 100 parts of ion-exchanged water was added. The resultant mixture was mixed by means of TK Homomixer (for 10 minutes at the rotational speed of 12,000 rpm), followed by filtering the resultant mixture.

(2): To the filtration cake of (1), 100 parts by mass of a 10% sodium hydroxide aqueous solution was added. The resultant mixture was mixed by means of TK Homomixer (for 30 minutes at the rotational speed of 12,000 rpm), followed by filtering the resultant mixture under the reduced pressure.

(3): To the filtration cake of (2), 100 parts of 10% hydrochloric acid was added. The resultant mixture was mixed by means of TK Homomixer (for 10 minutes at the rotational speed of 12,000 rpm), followed by filtering the resultant mixture.

(4): To the filtration cake of (3), 300 parts by mass of ion-exchanged water was added. The resultant mixture was mixed by means of TK Homomixer (for 10 minutes at the rotational speed of 12,000 rpm), followed by filtering the resultant mixture.

Filtration Cake 1 obtained was dried by means of an air-circulating drier for 48 hours at 45° C. Then, the resultant was passed through a sieve with a mesh size of 75 μm, to thereby obtain Toner Base Particles 1.

(External Additive Treatment)

To 100 parts by mass of Toner Base Particles 1, 0.6 parts by mass of hydrophobic silica having the average particle diameter of 100 nm 1.0 part by mass of titanium oxide having the average particle diameter of 20 nm, and 0.8 parts by mass of hydrophobic silica particles having the average particle diameter of 15 nm were added. The resultant mixture was mixed by HENSCHEL MIXER, to thereby obtain Toner 1.

(Number of Branches of Crosslinked Component)

Since Prepolymer A-1 was a product obtained by reacting the hydroxyl groups of Intermediate Polyester A-1 with the isocyanate groups of the HDI isocyanurate, the number of branches of the crosslinked component included in Toner 1 obtained was assumed to be 3 or greater.

(Glass Transition Temperature Tg of Prepolymer Measured by DSC)

The glass transition temperature Tg of Prepolymer A-1 included in Toner 1 obtained was −35.4° C.

A measurement method of the glass transition temperature Tg of Toner 1 will be described hereinafter.

Prepolymer A-1 was separated by Soxhlet extraction as a separation method. A sample container formed of aluminium was charged with 5.0 mg of Prepolymer A-1, which was a measurement sample, the sample container was placed on a holder unit, and the holder unit was set in an electric furnace. Next, the sample was heated from −80° C. to 150° C. at the heating rate of 10° C./min in a nitrogen atmosphere (first heating). Thereafter, the sample was cooled from 150° C. to −80° C. at the cooling rate of 10° C./min. Moreover, Prepolymer A-1 was heated in the same conditions as the first heating (second hearing). During the second heating, a DSC curve was measured by means of a differential scanning calorimeter (Q-200, available from TA INSTRUMENTS INC.). The DSC curve at the second heating was selected from the obtained DSC curves using the analysis program in the Q-200 system, to determine a glass transition temperature $Tg_{2nd}$ of Prepolymer A-1 at the second heating as Tg of the prepolymer as measured by DSC.

(Amount of THF Insoluble Component)

The amount of the THF insoluble component in Toner 1 obtained was 13.8% by mass.

A measurement method of the amount of the THF insoluble component in Toner 1 will be described hereinafter.

Toner 1 was weighed and collected by 1 g. Toner 1 collected was added to 100 mL of THF. The resultant was stirred by a stirrer for 6 hours at 25° C., to thereby obtain a solution in which the soluble component of Toner 1 was dissolved. Next, the solution was passed through a membrane filter having an opening size of 0.2 μm. The filtration cake was again added to 50 mL of THF, and the resultant was stirred by a stirrer for 10 minutes. The above-mentioned series of processes was repeated twice or three times, and the obtained filtration cake was dried at 120° C. and 10 kPa or lower, to thereby obtain a THF insoluble component. The obtained THF insoluble component was weighed by an electronic scale, and the amount of the THF insoluble component in Toner 1 was determined according to the following formula (2).

$$(\text{Amount of THF insoluble component (g)}/\text{amount of toner before extraction (g)})\times 100 \quad \text{Formula (2)}$$

Example 2

Toner 2 was obtained in the same manner as in Example 1, except that the 5% calcium chloride solution used in (Preparation of aqueous phase) was replaced with a 5% aluminium chloride solution.

Similarly to Example 1, the number of branches of the crosslinked component included in Toner 2 obtained was assumed to be 3 or greater.

The glass transition temperature Tg of Prepolymer A-1 contained in Toner 2 obtained was −37.6° C.

Moreover, the amount of the THF insoluble component in Toner 2 obtained was 13.9% by mass.

The glass transition temperature Tg and the amount of the THF insoluble component were measured in the same manner as in Example 1.

Example 3

Toner 3 was obtained in the same manner as in Example 2, except that the 5% magnesium chloride solution used in (Preparation of aqueous phase) was replaced with a 5% gallium chloride solution.

Similarly to Example 1, the number of branches of the crosslinked component included in Toner 3 obtained 1 was assumed to be 3 or greater.

The glass transition temperature Tg of Prepolymer A-1 contained in Toner 3 obtained was −37.9° C.

Moreover, the amount of the THF insoluble component in Toner 3 obtained was 14.2% by mass.

The glass transition temperature Tg and the amount of the THF insoluble component were measured in the same manner as in Example 1.

Example 4

Toner 4 was obtained in the same manner as in Example 2, except that the 5% magnesium chloride solution used in (Preparation of aqueous phase) was replaced with a 5% strontium hydroxide solution.

Similarly to Example 1, the number of branches of the crosslinked component included in Toner 4 obtained was assumed to be 3 or greater.

The glass transition temperature Tg of Prepolymer A-1 contained in Toner 4 obtained was −37.5° C.

Moreover, the amount of the THF insoluble component in Toner 4 obtained was 14.0% by mass.

The glass transition temperature Tg and the amount of the THF insoluble component were measured in the same manner as in Example 1.

Example 5

Toner 5 was obtained in the same manner as in Example 1, except that Prepolymer A-1 used in (Preparation of oil phase) was replaced with Prepolymer A-2.

Since Prepolymer A-2 was a polymer obtained by reacting isocyanate groups of the HDI isocyanurate with hydroxyl groups of Intermediate Polyester A-2, and further adding trimellitic anhydride, the number of branches of the crosslinked component included in Toner 5 obtained was assumed to be 3 or greater.

The glass transition temperature Tg of Prepolymer A-2 contained in Toner 5 obtained was −37.7° C.

Moreover, the amount of the THF insoluble component in Toner 5 obtained was 14.1% by mass.

The glass transition temperature Tg and the amount of the THF insoluble component were measured in the same manner as in Example 1.

Example 6

Toner 6 was obtained in the same mariner as in Example 4, except that Prepolymer A-1 used in (Preparation of oil phase) was replaced with Prepolymer A-2.

Similarly to Example 5, the number of branches of the crosslinked component included in Toner 6 obtained was assumed to be 3 or greater.

The glass transition temperature Tg of Prepolymer A-2 contained in Toner 6 obtained was −37.6° C.

Moreover, the amount of the THF insoluble component in Toner 6 obtained was 14.2% by mass.

The glass transition temperature Tg and the amount of the THF insoluble component were measured in the same manner as in Example 1.

Example 7

In Example 7, a toner was produced by an emulsification aggregation method.

(Preparation of Wax Emulsion 1)

To 100 parts by mass of ion-exchanged water, 28 parts by mass of wax (HNP-9, available from NIPPON SEIRO CO., LTD.), and SANISOL B50 serving as a surfactant were added. The resultant mixture was dispersed by a homogenizer with heating at 90° C., to thereby obtain Wax Emulsion 1. The solid content of Wax Emulsion 1 was 30%.

[Preparation of Crystalline Polyester Resin Dispersion Liquid 2]

A four-necked flask was charged with Crystalline Polyester Resin C-2 (55 parts by mass), methyl ethyl ketone (35 parts by mass), and 2-propyl alcohol (10 parts by mass). Thereafter, the resultant mixture was stirred with heating at a temperature equal to a melting point of Crystalline Polyester Resin C-2 to dissolve Crystalline Polyester Resin C-2. Thereafter, a 28% by mass ammonia aqueous solution was added in the manner that the neutralization index was to be 200%. The neutralization index was calculated from the acid value of the crystalline polyester resin. Moreover, 130 parts by mass of ion-exchanged water was gradually added to perform phase-transfer emulsification, followed by removing the solvent. Thereafter, ion-exchanged water was added to adjust the solid content (concentration of the crystalline polyester resin) to 25% by mass, to thereby obtain Crystalline Polyester Resin Dispersion Liquid 2, which was a dispersion of a binder resin for a toner. The particle diameter of the crystalline polyester resin in Crystalline Polyester Resin Dispersion Liquid 2 was 250 nm.

(Preparation of Oil Phase)

A four-necked flask was charged with 71 parts by mass of Amorphous Polyester Resin B, 30 parts by mass of Prepolymer A-2, and 5 parts by mass of carbon black, followed by adding 100 parts by mass of ethyl acetate. The resultant mixture was stirred to dissolve and disperse. Thereafter, 5 parts by mass of a 28% by mass ammonia aqueous solution was added in the manner that the neutralization index was to be 400%, to thereby obtain Oil Phase 7.

(Emulsification and Removal of Solvent)

To Oil Phase 7, 300 parts by mass of a 2% sodium dodecyl sulfate aqueous solution was gradually added to perform phase-transfer emulsification. Thereafter, the solvent was removed to thereby obtain Emulsified Slurry 7. The particle diameter of Emulsified Slurry 7 was measured, and the particle diameter thereof was 0.50 μm. Moreover, the solid content of Emulsified Slurry 7 was measured, and the solid content thereof was 23.0%.

(Aggregating and Fusing Step)

A vessel was charged with 117.5 parts by mass of Emulsified Slurry 7, 6.0 parts by mass of Crystalline Polyester Resin Dispersion Liquid 2, 5.0 parts by mass of Wax Emulsion 1, and 300 parts by mass of ion-exchanged water, and the resultant mixture was stirred for 1 minute. To the mixture, 100 parts by mass of a 5% magnesium chloride solution, and 50 parts by mass of a 5% calcium chloride solution were added by dripping, and the resultant was stirred for 5 minutes, followed by heating at 60° C. When the particle size of the particles in the resultant reached 5.0 μm, 50 parts by mass of sodium chloride was added to terminate aggregation, to thereby obtain Aggregation Slurry 7. Straight after obtaining Aggregation Slurry 7, Aggregation Slurry 7 was heated to 70° C. with stirring. When the circularity of the particles reached the desired value, i.e., 0.960, Aggregation Slurry 7 was cooled to thereby obtain Dispersion Slurry 7.

(Annealing, Washing, and Drying)

Dispersion Slurry 7 was stored for 10 hours at 45° C., followed by filtering under the reduced pressure. Thereafter, the resultant was washed and dried in the following manner. The following processes were repeated until the electric conductivity of the reslurry achieved the value of 10 μC/cm or less, followed by filtering to thereby obtain Filtration Cake 7.

(1): To the filtration cake, 100 parts of ion-exchanged water was added. The resultant mixture was mixed by means of TK Homomixer (for 10 minutes at the rotational speed of 12,000 rpm), followed by filtering the resultant mixture.

(2): To the filtration cake of (1), 900 parts by mass of ion-exchanged water was added. The resultant mixture was mixed by applying ultrasonic waves to vibrate and stirred by means of TK Homomixer (for 30 minutes at the rotational speed of 12,000 rpm), followed by filtering the resultant mixture under the reduced pressure.

Filtration Cake 7 was dried by means of an air-circulating drier for 48 hours at 45° C. Then, the resultant was passed through a sieve with a mesh size of 75 μm, to thereby obtain Toner Base Particles 7.

(External Additive Treatment)

To 100 parts by mass of Toner Base Particles 7, 0.6 parts by mass of hydrophobic silica having the average particle diameter of 100 nm, 1.0 part by mass of titanium oxide having the average particle diameter of 20 nm, and 0.8 parts by mass of hydrophobic silica particles having the average particle diameter of 15 nm were added. The resultant mixture was mixed by HENSCHEL MIXER, to thereby obtain Toner 7.

Similarly to Example 5, the number of branches of the crosslinked component included in Toner 7 obtained was assumed to be 3 or greater.

The glass transition temperature Tg of Prepolymer A-2 contained in Toner 7 obtained was −36.8° C.

Moreover, the amount of the THF insoluble component in Toner 7 obtained was 14.1% by mass.

The glass transition temperature Tg and the amount of the THF insoluble component were measured in the same manner as in Example 1.

Example 8

Toner 8 was obtained in the same manner as in Example 7, except that the 5% calcium chloride solution used in (Aggregating and fusing step) was changed to a 5% aluminium chloride solution and a 5% is strontium hydroxide solution.

Similarly to Example 5, the number of branches of the crosslinked component included in Toner 8 obtained was assumed to be 3 or greater.

The glass transition temperature of Prepolymer A-2 contained in Toner 8 obtained was −38.2° C.

Moreover, the amount of the THF insoluble component in Toner 8 obtained was 14.3% by mass.

The glass transition temperature Tg and the amount of the THF insoluble component were measured in the same manner as in Example 1.

Example 9

Toner 11 was obtained in the same manner as in Example 1, except that the 5% calcium chloride solution and the 5% magnesium chloride solution used in (Preparation of aqueous phase) were changed to only a 5% calcium chloride solution.

Similarly to Example 1, the number of branches of the crosslinked component included in Toner 11 obtained was assumed to be 3 or greater.

The glass transition temperature Tg of Prepolymer A-1 contained in Toner 11 obtained was −37.2° C.

Moreover, the amount of the THF insoluble component in Toner 11 obtained was 13.6% by mass.

The glass transition temperature Tg and the amount of the THF insoluble component were measured in the same manner as in Example 1.

Example 10

Toner 12 was obtained in the same manner as in Example 1, except that the 5% calcium chloride solution and the 5% magnesium chloride solution used in (Preparation of aqueous phase) were changed to only a 5% aluminium chloride solution.

Similarly to Example 1, the number of branches of the crosslinked component included in Toner 12 obtained was assumed to be 3 or greater.

The glass transition temperature Tg of Prepolymer A-1 contained in Toner 12 obtained was −36.9° C.

Moreover, the amount of the THF insoluble component in Toner 12 obtained was 14.0% by mass.

The glass transition temperature Tg and the amount of the THF insoluble component were measured in the same manner as in Example 1.

Example 11

Toner 13 was obtained in the same manner as in Example 1, except that, in (Preparation of oil phase), the amount of Prepolymer A-1 was changed from 300 parts by mass to 340 parts by mass, and the amount of Amorphous Polyester Resin B was changed from 650 parts by mass to 630 parts by mass.

Similarly to Example 1, the number of branches of the crosslinked component included in Toner 13 obtained was assumed to be 3 or greater.

The glass transition temperature Tg of Prepolymer A-1 contained in Toner 13 obtained was −35.4° C.

Moreover, the amount of the THF insoluble component in Toner 13 obtained was 15.0% by mass.

The glass transition temperature Tg and the amount of the THF insoluble component were measured in the same manner as in Example 1.

Example 12

Toner 14 was obtained in the same manner as in Example 1, except that, in the preparation of the oil phase, the amount of Prepolymer A-1 was changed from 300 parts by mass to 740 parts by mass, and the amount of Amorphous Polyester Resin B was changed from 650 parts by mass to 430 parts by mass. Similarly to Example 1, the number of branches of the crosslinked component included in Toner 14 obtained was assumed to be 3 or greater.

The glass transition temperature Tg of Prepolymer A-1 contained in Toner 14 obtained was −35.2° C.

Moreover, the amount of the THF insoluble component in Toner 14 obtained was 34.8% by mass.

The glass transition temperature Tg and the amount of the THF insoluble component were measured in the same manner as in Example 1.

Example 13

Toner 15 was obtained in the same manner as in Example 1, except that Prepolymer A-1 was replaced with Prepolymer A-3.

Similarly to Example 1, the number of branches of the crosslinked component included in Toner 15 obtained was assumed to be 3 or greater.

The glass transition temperature Tg of Prepolymer A-3 contained in Toner 15 Obtained was −60.0° C.

Moreover, the amount of the THF insoluble component in Toner 15 obtained was 13.6% by mass.

The glass transition temperature Tg and the amount of the THF insoluble component were measured in the same manner as in Example 1.

Example 14

Toner 16 was obtained in the same manner as in Example 1, except, that Prepolymer A-1 was replaced with Prepolymer A-4.

Similarly to Example 1, the number of branches of the crosslinked component included in Toner 16 obtained was assumed to be 3 or greater.

The glass transition temperature Tg of Prepolymer A-4 contained in Toner 16 obtained was −0.1° C.

Moreover, the amount of the THF insoluble component in Toner 16 obtained was 13.6% by mass.

The glass transition temperature Tg and the amount of the THF insoluble component were measured in the same manner as in Example 1.

Example 15

Toner 19 was obtained in the same manner as in Example 1, except that, in (Preparation of oil phase), the amount of Prepolymer A-1 was changed from 300 parts by mass to 560 parts by mass, and the amount of Amorphous Polyester Resin B was changed from 650 parts by mass to 240 parts by mass.

Similarly to Example 1, the number of branches of the crosslinked component included in Toner 19 obtained was assumed to be 3 or greater.

The glass transition temperature Tg of Prepolymer A-1 contained in Toner 19 obtained was −35.4° C.

Moreover, the amount of the THF insoluble component in Toner 19 obtained was 24.9% by mass.

The glass transition temperature Tg and the amount of the THF insoluble component were measured in the same manner as in Example 1.

Example 16

Toner 20 was obtained in the same manner as in Example 1, except that, in (Preparation of oil phase), the amount of Prepolymer A-1 was changed from 300 parts by mass to 560 parts by mass, and the amount of Amorphous Polyester Resin B was changed from 650 parts by mass to 240 parts by mass, and in (Preparation of aqueous phase), the 5% calcium chloride solution was replaced with a 5% aluminium chloride solution, and the 5% magnesium chloride solution was replaced with a 5% strontium hydroxide solution.

Similarly to Example 1, the number of branches of the crosslinked component included in Toner 20 obtained was assumed to be 3 or greater.

The glass transition temperature Tg of Prepolymer A-1 contained in Toner 20 obtained was −34.8° C.

Moreover, the amount of the THF insoluble component in Toner 20 obtained was 25.3% by mass.

The glass transition temperature Tg and the amount of the THF insoluble component were measured in the same manner as in Example 1.

Comparative Example 1

Toner 9 was obtained in the same manner as in Example 1, except, that (Preparation of oil phase) and (Preparation of aqueous phase) were changed as follows.

(Preparation of Oil Phase)

A vessel was charged with 500 parts by mass of Wax Dispersion Liquid 1, 300 parts by mass of Prepolymer a-1, 500 parts by mass of Crystalline Polyester Resin Dispersion Liquid 1, 700 parts by mass of Amorphous Polyester Resin B, 100 parts by mass of Master Batch 1, and 2 parts by mass of a 20% IPDA ethyl acetate solution. Thereafter, the resultant mixed solution was mixed by means of TK Homomixer (available from PRIMIX CORPORATION) for 60 minutes at 5,000 rpm, to thereby obtain Oil Phase 9.

(Preparation of Aqueous Phase)

Water (990 parts by mass), 83 parts by mass of Particle Dispersion Liquid 1, 37 parts by mass of a 48.5% by mass sodium dodecyldiphenyl ether disulfonate aqueous solution (ELEMINOL MON-7, available from Sanyo Chemical Industries, Ltd.), and 90 parts by mass of ethyl acetate were mixed and stirred, to thereby milky white liquid, which was provided as Aqueous Phase 9.

Similarly to Example 1, the number of branches of the crosslinked component included in Toner 9 obtained was assumed to be 3 or greater.

The glass transition temperature Tg of Prepolymer a-1 contained in Toner 9 obtained was −38.5° C.

Moreover, the amount of the THF insoluble component in Toner 9 obtained was 14.6% by mass.

The glass transition temperature Tg and the amount of the THF insoluble component were measured in the same manner as in Example 1.

Comparative Example 2

Toner 10 was obtained in the same manner as in Example 1, except that Prepolymer A-1 was replaced with Prepolymer a-2.

Since Prepolymer a-2 was a linear polymer, the number of branches of the crosslinked component included in Toner 10 was 2 or less.

The glass transition temperature Tg of Prepolymer a-2 contained in Toner 10 obtained was −38.8° C.

Moreover, the amount of the THF insoluble component in Toner 10 obtained was 8.5% by mass.

The glass transition temperature Tg and the amount of the THF insoluble component were measured in the same manner as in Example 1.

Comparative Example 3

Toner 17 was obtained in the same manner as in Example 1, except that Prepolymer A-1 was replaced with Prepolymer a-3.

Similarly to Example 1, the number of branches of the crosslinked component included in Toner 17 obtained was assumed to be 3 or greater.

The glass transition temperature Tg of Prepolymer a-3 contained in Toner 17 obtained was 5.2° C.

Moreover, the amount of the THF insoluble component in the obtained toner obtained was 13.8% by mass.

The glass transition temperature Tg and the amount of the THF insoluble component were measured in the same manner as in Example 1.

Comparative Example 4

Toner 18 was obtained in the same manner as in Example 1, except that Prepolymer A-1 was replaced with Prepolymer a-4.

Similarly to Example 1, the number of branches of the crosslinked component included in Toner 18 obtained was assumed to be 3 or greater.

The glass transition temperature Tg of Prepolymer a-4 contained in Toner 18 obtained was −67.6° C.

Moreover, the amount of the THF insoluble component in Toner 18 obtained was 13.9% by mass.

The glass transition temperature Tg and the amount of the THF insoluble component were measured in the same manner as in Example 1.

<Evaluation>

Chargeability, low temperature fixability, hot offset resistance, and blocking resistance of the obtained toners of Examples and Comparative Examples were evaluated.

[Chargeability]

The chargeability of the toner was evaluated by calculating the quantity of electric charge of the toner. In the environment of 23° C. and 53%±3% RH, a SUS cylindrical container (internal diameter: 25 mm, height: 30 mm) was charged with 0.35 g of the toner and 5 g of the carrier to condition the toner and the carrier for 12 hours or longer. Thereafter, the container was sealed, and was rotated for 5 minutes at the rotational speed of 300 rpm. The mixture of the toner and the carrier was sampled from the container and the sampled mixture was placed in a blow-off gauge with 400-mesh. After blowing air for 3 minutes at the air pressure of 5 KPa, the sample was measured by means of a Q/M meter (available from EPPING GmbH). As the setting of the Q/M meter, the mesh size was 400-mesh (formed of stainless steel), the soft blow pressure was 1,050 V, and the suction time was 90 seconds. The quantity of electric charge was calculated according to the following formula (3). When the quantity of electric charge was 26 μC/g or greater, chargeability of the toner was evaluated as being excellent.

Quantity of electric charge (μC/g)=total quantity of electricity (μC) after 90 seconds/suctioned toner amount (g)   Formula (3)

[Low Temperature Fixability]

The low temperature fixability of the toner was evaluated by measuring the minimum fixing temperature of the toner. By means of a device obtained by modifying a fixing unit of imageo MP C5002 (available from Ricoh Company Limited), a printing test was performed on Type 6200 paper (available from Ricoh Company Limited). Specifically, the fixing temperature was varied to measure a temperature at which cold offset occurred (i.e., the minimum fixing temperature). As evaluation conditions of the minimum fixing temperature, the linear speed of paper feeding was set to 200 mm/sec, the bearing pressure was set to 1.0 kgf/cm$^2$, and the nip width was set, to 7 mm. When the minimum fixing temperature was lower than 140° C., the toner obtained according to the present aspect was evaluated as having sufficient low temperature fixability.

(Evaluation Criteria)

A: lower than 120° C.

B: 120° C. or higher but lower than 130° C.

C: 130° C. or higher but lower than 140° C.

D: 140° C. or higher

[Hot Offset Resistance]

The hot offset resistance of the toner was evaluated by measuring the maximum fixing temperature of the toner. By means of a device obtained by modifying a fixing unit of imageo MP C5002 (available from RICOH COMPANY LIMITED), a printing test was performed on Type 6200 paper (available from RICOH COMPANY LIMITED). Specifically, the fixing temperature was varied to measure a temperature at which hot offset occurred (i.e., the maximum fixing temperature). As evaluation conditions of the maximum fixing temperature, the linear speed of paper feeding was set to 100 mm/sec, the bearing pressure was set to 1.0 kgf/cm$^2$, and the nip width was set to 7 mm. When the maximum fixing temperature was 170° C. or higher, the toner obtained according to the present aspect was evaluated as having sufficient hot offset resistance.

[Blocking Resistance]

A rectangular solid image in the size of 3 cm×15 cm was formed on one side of PPC sheet Type 6000<70 W> A4 long grain paper (available from RICOH COMPANY LIMITED) with the toner deposition amount of 0.85 mg/cm$^2$. The solid image was continuously printed and 200 sheets were output. The fixing temperature was controlled in the manner that the center of the temperature range was set to a temperature that was the cold offset temperature+20° C. The output images on the 200 sheets were stacked and left to stand for 1 hour. Thereafter, the sticking between the images was evaluated based on the following evaluation criteria. When the evaluation result of the blocking resistance was "A" or "B," the toner obtained according to the present aspect was evaluated as having sufficient blocking resistance.

(Evaluation Criteria)

A: The sheets did not stick to one another at all.

B: The sheets were slightly stacked to one another but there was no problem in the images when the sheets were separated.

C: The sheets were slightly stacked to one another, and there was a change in gloss of the images when the sheets were separated.

D: The sheets were stacked to one another, and the images or sheets were damaged when the sheets were separated.

[Comprehensive Evaluation]

The comprehensive evaluation was evaluated according to the following evaluation criteria.

When all of the evaluation results were "B" or "A," the amount of electric charge was 30 μC/g or greater, and the maximum fixing temperature was 180° C. or higher, it was judged as "A."

When all of the evaluation results were "B" or "A," the amount of electric charge was 26 μC/g or greater, and the maximum fixing temperature was 170° C. or higher, it was judged as "B."

When all of the evaluation results were "B" or "A," the amount of electric charge was 20 μC/g or greater but 26 μC/g or less, and the maximum fixing temperature was 160° C. or higher but lower than 170° C., it was judged as "C."

When the evaluation results included one or more "C" or "D," or the amount of electric charge was less than 20 μC/g, or the maximum fixing temperature was lower than 160° C., it was judged as "D."

(Evaluation Criteria)

A: Very excellent

B: Excellent

C: Excellent to some extent

D: Identical to the related art, or not suitable for practical use

The evaluation results of the toilers obtained in Examples and Comparative Examples, i.e., the quantity of electric charge, the minimum fixing temperature, and the maximum fixing temperature, and the blocking resistance, are presented in Tables 1-1 and 1-2.

Moreover, the following numerical values were used for the ionic radius (pm) of the metal ions.

Bivalent calcium ion of calcium chloride: 100 pm

Bivalent magnesium ion of magnesium chloride: 72 pm

Trivalent aluminium ion of aluminium chloride: 54 pm

Trivalent gallium ion of gallium chloride: 47 pm

Trivalent strontium ion of strontium hydroxide: 118 pm

TABLE 1-1

| | Intermediate polyester | | | | | | | | | |
|---|---|---|---|---|---|---|---|---|---|---|
| | | Monomer composition (mol) | | | | | | | | |
| | Type | 3-methyl-1,5-pentane diol | Bisphenol A ethylene oxide adduct | Isophthalic acid | Adipic acid | 1,10-dodecane dioic acid | Trimellitic anhydride | Structure Branch | Prepolymer Structure Branch | Method |
| Ex. 1 | A-1 | 110 | 0 | 40 | 60 | 0 | 0 | None | Present | Dissolution suspension |
| Ex. 2 | A-1 | 110 | 0 | 40 | 60 | 0 | 0 | None | Present | Dissolution suspension |
| Ex. 3 | A-1 | 110 | 0 | 40 | 60 | 0 | 0 | None | Present | Dissolution suspension |
| Ex. 4 | A-1 | 110 | 0 | 40 | 60 | 0 | 0 | None | Present | Dissolution suspension |
| Ex. 5 | A-2 | 110 | 0 | 40 | 60 | 0 | 1 | Present | Present | Dissolution suspension |
| Ex. 6 | A-2 | 110 | 0 | 40 | 60 | 0 | 1 | Present | Present | Dissolution suspension |
| Ex. 7 | A-2 | 110 | 0 | 40 | 60 | 0 | 1 | Present | Present | Emulsification aggregation |
| Ex. 8 | A-2 | 110 | 0 | 40 | 60 | 0 | 1 | Present | Present | Emulsification aggregation |
| Ex. 9 | A-1 | 110 | 0 | 40 | 60 | 0 | 0 | None | Present | Dissolution suspension |
| Ex. 10 | A-1 | 110 | 0 | 40 | 60 | 0 | 0 | None | Present | Dissolution suspension |

TABLE 1-1-continued

| | Intermediate polyester | | | | | | | | | |
|---|---|---|---|---|---|---|---|---|---|---|
| | | Monomer composition (mol) | | | | | | | | |
| | Type | 3-methyl-1,5-pentane diol | Bisphenol A ethylene oxide adduct | Isophthalic acid | Adipic acid | 1,10-dodecane dioic acid | Trimellitic anhydride | Structure Branch | Prepolymer Structure Branch | Method |
| Ex. 11 | A-1 | 110 | 0 | 40 | 60 | 0 | 0 | None | Present | Dissolution suspension |
| Ex. 12 | A-1 | 110 | 0 | 40 | 60 | 0 | 0 | None | Present | Dissolution suspension |
| Ex. 13 | A-3 | 110 | 0 | 0 | 100 | 0 | 0 | None | Present | Dissolution suspension |
| Ex. 14 | A-4 | 110 | 0 | 100 | 0 | 0 | 0 | None | Present | Dissolution suspension |
| Ex. 15 | A-1 | 110 | 0 | 40 | 60 | 0 | 0 | None | Present | Dissolution suspension |
| Ex. 16 | A-1 | 110 | 0 | 40 | 60 | 0 | 0 | None | Present | Dissolution suspension |
| Comp. Ex. 1 | a-1 | 110 | 0 | 40 | 60 | 0 | 1 | Present | Present | Dissolution suspension |
| Comp. Ex. 2 | a-2 | 100 | 0 | 50 | 60 | 0 | 0 | None | None | Dissolution suspension |
| Comp. Ex. 3 | a-3 | 80 | 30 | 100 | 0 | 0 | 0 | None | Present | Dissolution suspension |
| Comp. Ex. 4 | a-4 | 110 | 0 | 0 | 0 | 100 | 0 | None | Present | Dissolution suspension |

TABLE 1-2

| | Toner | | | Evaluation | | | | |
|---|---|---|---|---|---|---|---|---|
| | | Metal ion | | | | | | |
| | Type | ion | Difference in ionic radius [pm] | Quantity of electric charge [−μC/g] | Minimum fixing temperature | Maximum fixing temperature [° C.] | Blocking resistance | Comprehensive resistance |
| Ex. 1 | 1 | $Mg^{2+}/Ca^{2+}$ | 28 | 26 | B | 170 | A | B |
| Ex. 2 | 2 | $Mg^{3+}/Al^{3+}$ | 18 | 30 | B | 172 | B | B |
| Ex. 3 | 3 | $Al^{3+}/Ga^{3+}$ | 7 | 31 | B | 175 | B | B |
| Ex. 4 | 4 | $Al^{3+}/Sr^{3+}$ | 64 | 35 | B | 173 | A | B |
| Ex. 5 | 5 | $Mg^{2+}/Ca^{2+}$ | 28 | 27 | B | 170 | A | B |
| Ex. 6 | 6 | $Al^{3+}/Sr^{2+}$ | 64 | 32 | B | 178 | A | B |
| Ex. 7 | 7 | $Mg^{2+}/Ca^{2+}$ | 28 | 26 | B | 170 | B | B |
| Ex. 8 | 8 | $Al^{3+}/Sr^{2+}$ | 64 | 29 | B | 174 | A | B |
| Ex. 9 | 11 | $Mg^{2+}$ | — | 26 | B | 165 | B | C |
| Ex. 10 | 12 | $Al^{3+}$ | — | 25 | B | 167 | B | C |
| Ex. 11 | 13 | $Mg^{2+}/Ca^{2+}$ | 28 | 26 | B | 180 | A | B |
| Ex. 12 | 14 | $Mg^{2+}/Ca^{2+}$ | 28 | 26 | A | 200 | B | B |
| Ex. 13 | 15 | $Mg^{2+}/Ca^{2+}$ | 28 | 23 | A | 160 | B | C |
| Ex. 14 | 16 | $Mg^{2+}/Ca^{2+}$ | 28 | 29 | B | 175 | A | B |
| Ex. 15 | 19 | $Mg^{2+}/Ca^{2+}$ | 28 | 26 | A | 195 | A | B |
| Ex. 16 | 20 | $Al^{3+}/Sr^{2+}$ | 64 | 35 | A | 200 | A | A |
| Comp. Ex. 1 | 9 | IDPA | — | −1 | C | 165 | D | D |
| Comp. Ex. 2 | 10 | $Mg^{2+}/CA^{2+}$ | 28 | 25 | D | 155 | C | D |
| Comp. Ex. 3 | 17 | $Mg^{2+}/CA^{2+}$ | 28 | 31 | D | 175 | A | D |
| Comp. Ex. 4 | 18 | $Mg^{2+}/CA^{2+}$ | 28 | 19 | A | 150 | D | D |

It was confirmed from. Table 1 that the toners of Examples 1 to 16 all satisfied conditions on practical use for chargeability, low temperature fixability, hot offset resistance, and blocking resistance. In contrast, it was confirmed that the toners of Comparative Examples 1 to 4 did not satisfy the desired conditions on practical use in at least one of the chargeability, low temperature fixability, hot offset resistance, and blocking resistance, and there was a problem on practical use.

Unlike the toners of Comparative Examples 1 to 4, the toners of Examples 1 to 16 each included a crosslinked component, where the crosslinked component includes a nonlinear polymer having 3 or more branches terminal of which are metal ion crosslinked, and a glass transition temperature Tg of the nonlinear polymer is −60° C. or higher but lower than 0° C., and therefore the toners exceled in chargeability, low temperature fixability, hot offset resistance, and blocking resistance after fixing, and were high quality toners.

The aspects and embodiments of the present disclosure are described as above. The above-described aspects and embodiments are illustrative, and do not limit the present disclosure. The above-described aspects and embodiments are therefore carried out in various ways. Various combinations, simplifications, substitutions, and changes may be made within the scope of the present specification. Such embodiments, aspects, and modifications thereof are included in the scope of the present disclosure, and are regarded as equivalents to the invention defined in the scope of the inventions.

For example, embodiments of the present disclosure are as follows.

<1> A toner including toner base particles, each toner base particle including a crosslinked component, wherein the crosslinked component includes a nonlinear polymer having 3 or more branches, terminals of which are metal ion crosslinked, and a glass transition temperature Tg of the nonlinear polymer as measured by differential scanning calorimetry is −60° C. or higher but lower than 0° C.

<2> A toner including toner base particles, each toner base particles including a crosslinked component, wherein the crosslinked component includes a binder resin, and the binder resin includes a tetrahydrofuran (THF) insoluble component, the THF insoluble component includes a nonlinear polymer having 3 or more branches, and metal ions, and a glass transition temperature Tg of the THF insoluble component as measured by differential scanning calorimetry is −60° C. or higher but lower than 0° C.

<3> The toner according to <2>, wherein an amount of the THF insoluble component is from 15% by mass through 35% by mass.

<4> The toner according to any one of <1> to <3>, wherein the metal ion crosslink of the nonlinear polymer includes two divalent or higher metal ions.

<5> The toner according to <4>, wherein the two divalent or higher metal ions have mutually different valencies.

<6> The toner according to <4> or <5>, wherein a difference in an ionic radius between the two divalent or higher metal ions is 50 pm or greater.

<7> A developer including:

a carrier; and the toner according to any one of <1> to <6>.

<8> A toner storage unit including:

a container; and the toner according to any one of <1> to <6>, where the toner is stored in the container.

<9> A method for producing a toner, the method including:

mixing an aqueous medium and an oil phase including a prepolymer that is a nonlinear reactive precursor, to generate a nonlinear polymer through an elongation reaction, or a cross-linking reaction, or both of the prepolymer and a curing agent, to thereby form toner base particles, wherein the toner is the toner according to any one of <1> to <6>.

<10> A method for producing a toner, the method including:

mixing an aqueous medium and an oil phase including a prepolymer that is a nonlinear reactive precursor, and an active hydrogen group-containing compound, to generate a nonlinear polymer through an elongation reaction, or a cross-linking reaction, or both of the prepolymer and a curing agent, to thereby form toner base particles, wherein the toner is the toner according to any one of <1> to <6>.

<11> A method for producing a toner, the method including:

removing an organic solvent from an oil phase prepared by dissolving or dispersing in the organic solvent a polyester resin and a prepolymer that is a nonlinear reactive precursor through phase-transfer emulsification, followed by mixing with a dispersion liquid including a crystalline polyester resin to prepare a mixture solution; and allowing the crystalline polyester resin in the mixture solution to aggregate to form toner base particles to produce a toner, wherein the toner is the toner according to any one of <1> to <6>.

<12> An image forming apparatus including:

an electrostatic latent image bearer;

an electrostatic latent image forming unit configured to form an electrostatic latent image on the electrostatic latent image bearer;

a developing unit configured to develop the electrostatic latent image with a toner to form a visible image;

a transferring unit configured to transfer the visible image onto a recording medium; and a fixing unit configured to fix the visible image transferred to the recording medium, wherein the toner is the toner according to any one of <1> to <6>.

<13> An image forming method including:

forming an electrostatic latent image on an electrostatic latent image bearing member;

developing the electrostatic latent image with a toner to form a visible image;

transferring the visible image onto a recording medium; and fixing the visible image transferred on the recording medium, wherein the toner is the toner according to any one of <1> to <6>.

<14> Resin particles each including a crosslinked component, wherein the crosslinked component includes a binder resin, and the binder resin includes a tetrahydrofuran (THF) insoluble component, the THF insoluble component includes a nonlinear polymer having 3 or more branches, and metal ions, and a glass transition temperature Tg of the THF insoluble component as measured by differential scanning calorimetry is −60° C. or higher but lower than 0° C.

The toner according to any one of <1> to <6>, the developer according to <7> the toner storage unit according to <8>, the method for producing a toner according to any one of <9> to <11>, the image forming apparatus according to <12>, the image forming method according to <13>, and the resin particles according to <14> can solve the above-described various problems existing in the art and can achieve the object of the present disclosure.

What is claimed is:

1. A toner, comprising:

toner base particles, each toner base particle including a crosslinked component, wherein the crosslinked component includes a nonlinear polymer obtained from reaction of polyester resin and HDI isocyanurate, terminals of which are metal ion crosslinked, and a glass transition temperature Tg of the nonlinear polymer as measured by differential scanning calorimetry is −60° C. or higher but lower than 0° C.; and wherein the toner contains a THF-insoluble fraction with respect to a total mass of the toner, the content of which is between 15% and 35% by mass; and wherein the metal ion crosslink of the nonlinear polymer includes two or more divalent or higher metal ions.

2. A toner comprising toner base particles, each of the toner base particles including a crosslinked component, wherein the crosslinked component includes a binder resin, and the binder resin includes a tetrahydrofuran (THF) insoluble component, the THF insoluble component includes a nonlinear polymer obtained from reaction of polyester resin and HDI isocyanurate, terminals of which are metal ion crosslinked, wherein an amount of the THF insoluble component is from 15% by mass through 35% by mass, and a glass transition temperature Tg of the THF insoluble component as measured by differential scanning calorimetry is −60° C. or higher but lower than 0° C., wherein the metal ion crosslink of the nonlinear polymer includes two or more divalent or higher metal ions.

3. The toner according to claim 1, wherein the two divalent or higher metal ions have mutually different valencies.

4. The toner according to claim 1, wherein a difference in an ionic radius between the two divalent or higher metal ions is 50 μm or greater.

5. A developer, comprising:

a carrier; and the toner according to claim 1.

6. A toner storage unit, comprising:

a container; and the toner according to claim 1, wherein the toner is stored in the container.

7. A method for producing a toner, the method comprising:

mixing an aqueous medium and an oil phase including a prepolymer that is a nonlinear reactive precursor, to generate a nonlinear polymer through an elongation reaction, or a cross-linking reaction, or both of the prepolymer and a curing agent, to thereby form toner base particles, wherein the toner is the toner according to claim 1.

8. A method for producing a toner, the method comprising:

mixing an aqueous medium and an oil phase including a prepolymer that is a nonlinear reactive precursor, and an active hydrogen group-containing compound, to generate a nonlinear polymer through an elongation reaction, or a cross-linking reaction, or both of the prepolymer and a curing agent, to thereby form toner base particles, wherein the toner is a toner according to claim 1.

9. A method for producing a toner, the method comprising:

removing an organic solvent from an oil phase prepared by dissolving or dispersing in the organic solvent a polyester resin and a prepolymer that is a nonlinear reactive precursor through phase-transfer emulsification, followed by mixing with a dispersion liquid including a crystalline polyester resin to prepare a mixture solution; and the crystalline polyester resin in the mixture solution to aggregate to form toner base particles to produce a toner, wherein the toner is the toner according to claim 1.

10. An image forming apparatus, comprising:

an electrostatic latent image bearer;

an electrostatic latent image forming unit configured to form an electrostatic latent image on the electrostatic latent image bearer;

a developing unit configured to develop the electrostatic latent image with a toner to form a visible image;

a transferring unit configured to transfer the visible image onto a recording medium; and a fixing unit configured to fix the visible image transferred to the recording medium, wherein the toner is the toner according to claim 1.

11. An image forming method, comprising:

forming an electrostatic latent image on an electrostatic latent image bearing member;

developing the electrostatic latent image with a toner to form a visible image;

transferring the visible image onto a recording medium; and fixing the visible image transferred on the recording medium, wherein the toner is the toner according to claim 1.

12. Resin particles each comprising a crosslinked component, wherein the crosslinked component includes a binder resin, and the binder resin includes a tetrahydrofuran (THF) insoluble component, the THF insoluble component includes a nonlinear polymer obtained from reaction of polyester resin and HDI isocyanurate, terminals of which are metal ion crosslinked, and a glass transition temperature Tg of the THF insoluble component as measured by differential scanning calorimetry is −60° C. or higher but lower than 0° C., wherein the metal ion crosslink of the nonlinear polymer includes two or more divalent or higher metal ions.

13. The toner according to claim 1, wherein the two or more divalent or higher metal ions are selected from the group consisting of magnesium ion/calcium ion, magnesium ion/aluminum ion, aluminum ion/gallium ion, and aluminum ion/strontium ion.

14. A toner, comprising:

toner base particles, each toner base particle including a crosslinked component, wherein the crosslinked component includes a nonlinear polymer having 3 or more branches, terminals of which are metal ion crosslinked, and a glass transition temperature Tg of the nonlinear polymer as measured by differential scanning calorimetry is −60° C. or higher but lower than 0° C.; and wherein the toner contains a THF-insoluble fraction with respect to a total mass of the toner, the content of which is between 15% and 35% by mass; and wherein the metal ion crosslink of the nonlinear polymer includes two or more divalent or higher metal ions, wherein the two or more divalent or higher metal ions include any one of a strontium ion, a gallium ion, an indium ion, and a thallium ion.

* * * * *